US009626740B2

(12) United States Patent
Asano

(10) Patent No.: US 9,626,740 B2
(45) Date of Patent: Apr. 18, 2017

(54) IMAGE PROCESSING APPARATUS AND IMAGE PROCESSING METHOD

(71) Applicant: Konica Minolta, Inc., Chiyoda-ku, Tokyo (JP)

(72) Inventor: Motohiro Asano, Osaka (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 14/780,798

(22) PCT Filed: Mar. 13, 2014

(86) PCT No.: PCT/JP2014/056618
§ 371 (c)(1),
(2) Date: Sep. 28, 2015

(87) PCT Pub. No.: WO2014/156669
PCT Pub. Date: Oct. 2, 2014

(65) Prior Publication Data
US 2016/0048946 A1  Feb. 18, 2016

(30) Foreign Application Priority Data

Mar. 29, 2013 (JP) .................................. 2013-072932

(51) Int. Cl.
| G06K 9/00 | (2006.01) |
| G06T 3/40 | (2006.01) |
| H04N 1/387 | (2006.01) |
| G06T 7/40 | (2017.01) |
| H04N 5/225 | (2006.01) |
| H04N 5/232 | (2006.01) |
| H04N 5/265 | (2006.01) |
| H04N 9/04 | (2006.01) |

(52) U.S. Cl.
CPC ............ *G06T 3/4053* (2013.01); *G06T 7/408* (2013.01); *H04N 1/387* (2013.01); *H04N 5/2254* (2013.01);
(Continued)

(58) Field of Classification Search
USPC ....... 382/162, 299, 275, 294, 100, 103, 141; 348/207.1, 207.2, 207.99, 352, 364, (Continued)

(56) References Cited

U.S. PATENT DOCUMENTS 7,809,155 B2 * 10/2010 Nestares ............... G06T 3/4053
358/1.2
8,295,599 B2 * 10/2012 Katougi ................ G06T 3/4069
382/103
(Continued)

FOREIGN PATENT DOCUMENTS

JP    2010278898 A    12/2010

OTHER PUBLICATIONS

International Search Report corresponding to Application No. PCT/JP2014/056618; Date of Mailing: May 13, 2014, with English translation.
(Continued)

*Primary Examiner* — Anh Do
(74) *Attorney, Agent, or Firm* — Cantor Colburn LLP

(57) ABSTRACT

An image processing apparatus includes a super-resolution processing unit for executing super-resolution processing on one input image among an input image group having a plurality of color channels and input images each having a common partial region, a resolution conversion unit for executing resolution conversion processing on the input image having been subjected to the super-resolution processing, and a specification unit for specifying a combination of a magnification of the super-resolution processing and a magnification of the resolution conversion processing for each color channel. The specification unit specifies the combination so that a magnification of the super-resolution processing of at least one color channel differs from a magnification of the super-resolution processing of other color channels.

10 Claims, 22 Drawing Sheets

(52) U.S. Cl.
CPC ......... *H04N 5/23232* (2013.01); *H04N 5/265* (2013.01); *H04N 9/045* (2013.01); *G06T 2207/10016* (2013.01); *G06T 2207/10024* (2013.01)

(58) Field of Classification Search
USPC .................................. 348/E5.024; 358/1.18
See application file for complete search history.

(56) References Cited

U.S. PATENT DOCUMENTS

| | | | | |
|---|---|---|---|---|
| 8,300,141 B2 * | 10/2012 | Ohnishi | ................ | G06T 7/0002 348/207.2 |
| 8,310,550 B2 * | 11/2012 | Hayasaki | ........... | H04N 1/00307 348/207.2 |
| 8,441,537 B2 * | 5/2013 | Hayasaki | ............... | H04N 1/387 348/207.1 |
| 8,502,875 B2 * | 8/2013 | Matsuda | ............ | H04N 1/00204 348/207.2 |
| 8,587,818 B2 * | 11/2013 | Imaizumi | ............... | H04N 1/387 348/207.2 |

OTHER PUBLICATIONS

Written Opinion of the International Searching Authority corresponding to Application No. PCT/JP2014/056618; Date of Mailing: May 13, 2014.

* cited by examiner

FIG. 11
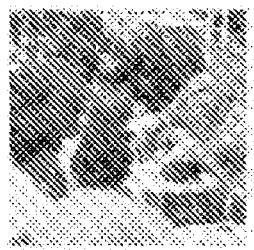
G: ONE INPUT IMAGE
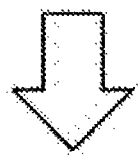
G: 3-TIME SUPER-RESOLUTION

R: 3-TIME SUPER-RESOLUTION

R: SUPER-RESOLUTION + 3-TIME
RESOLUTION CONVERSION

FIG. 16
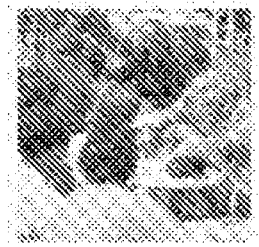
G: ONE INPUT IMAGE
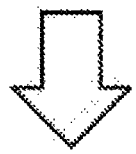
G: 3-TIME SUPER-RESOLUTION

RGB1

ONE PIXEL OF INPUT IMAGE

ONE PIXEL OBTAINED AFTER SUPER-RESOLUTION PROCESSING

RGB2

SHIFT BETWEEN INPUT IMAGES

IMAGE PROCESSING APPARATUS AND IMAGE PROCESSING METHOD

CROSS REFERENCE TO RELATED APPLICATIONS

This is the U.S. national stage of application No. PCT/JP2014/056618, filed on Mar. 13, 2014. Priority under 35 U.S.C. §119(a) and 35 U.S.C. §365(b) is claimed from Japanese Application No. 2013-072932, filed Mar. 29, 2013, the disclosure of which is also incorporated herein by reference.

TECHNICAL FIELD

The present invention relates to an image processing apparatus and an image processing method, particularly to an image processing apparatus and an image processing method for performing processing for improving resolution.

BACKGROUND ART

There is an image processing technique for generating one high resolution image from a low resolution multi-view input image group or a consecutive input image group that has a common partial region. Such processing is also referred to as super-resolution processing. Such super-resolution processing has a large amount of calculation, and slow processing speed.

In contrast, JP 2010-278898 A (hereinafter, Patent Literature 1) discloses a technique for reducing the amount of calculation by combining super-resolution processing at a pre-fixed magnification and resolution conversion processing at an optionally settable magnification, and reducing power consumption to make resolution variable.

CITATION LIST

Patent Literature

Patent Literature 1: JP 2010-278898 A

SUMMARY OF INVENTION

Technical Problem

Even in the case of using the technique of Patent Literature 1, however, since the super-resolution processing is performed at a pre-fixed uniform magnification, the processing time required for the super-resolution processing cannot be shortened. This causes a problem of limitation on a reduction in the amount of calculation, that is, an increase in the processing speed.

The present invention has been devised in view of such a problem, and an object of the present invention is to provide an image processing apparatus and an image processing method that can speed up processing for generating a high resolution image.

Solution to Problem

In order to achieve the above object, according to an aspect of the present invention, an image processing apparatus for generating, from an input image group having a plurality of color channels and input images each having a common partial region, a high resolution image having higher frequency information than the input images, and outputting the generated high resolution image, includes: a first processing unit for executing super-resolution processing on the input images; a second processing unit for executing resolution conversion processing on the input images having been subjected to the super-resolution processing; and a specification unit for specifying a combination of a magnification of the super-resolution processing and a magnification of the resolution conversion processing for each of the color channels. The specification unit specifies the combination so that a magnification of the super-resolution processing of at least one of the color channels differs from a magnification of the super-resolution processing of other color channels of the color channels.

Preferably, the specification unit specifies a magnification of the super-resolution processing according to the number of pixels for each of the color channels that are to be used in the super-resolution processing among the input image group, and specifies a magnification of the resolution conversion processing based on a magnification of the super-resolution processing specified for each of the color channels.

More preferably, the specification unit sets 1 as a magnification of the resolution conversion processing for a first color channel having a highest magnification of the super-resolution processing, and specifies a magnification of the resolution conversion processing of color channels other than the first color channel so that, for each of color channels other than the first color channel, the number of pixels of the color channel that is obtainable after the resolution conversion processing becomes the same as the number of pixels of the first color channel that is obtainable after the super-resolution processing.

Preferably, the input image group has a color channel of a single color for each of the input images.

More preferably, the image processing apparatus further includes a selection unit for selecting, from among the input images, an input image to be used in the super-resolution processing, for each color channel of the input images.

Preferably, in the input image group, each of the input images has a different color channel for each pixel, and the first processing unit uses, among the input images, a pixel corresponding to a color channel to be subjected to the super-resolution processing.

Preferably, the input image group is an image group obtained by a lens array including a plurality of lenses having optical axes different from each other.

Preferably, the input image group is captured by an imaging apparatus at different timings with viewpoints being varied from each other.

According to another aspect of the present invention, an image processing method for generating, from an input image group having a plurality of color channels and input images each having a common partial region, a high resolution image having higher frequency information than the input images, as an output image, includes a step of specifying a combination of a magnification of super-resolution processing and a magnification of resolution conversion processing for each of the color channels, a step of executing, on the input images, the super-resolution processing at the specified magnification, and a step of executing, on the input images having been subjected to the super-resolution processing, the resolution conversion processing at the specified magnification. In the step of specifying the combination, the combination is specified so that a magnification of the super-resolution processing of at least one of the color channels differs from a magnification of the super-resolution processing of other color channels of the color channels.

According to yet another aspect of the present invention, an image processing program for causing a computer to execute processing for generating, from an input image group having a plurality of color channels and input images each having a common partial region, a high resolution image having higher frequency information than the input images, as an output image, and causing the computer to execute a step of specifying a combination of a magnification of super-resolution processing and a magnification of resolution conversion processing for each of the color channels, a step of executing, on the input images, the super-resolution processing at the specified magnification, and a step of executing, on the input images having been subjected to the super-resolution processing, the resolution conversion processing at the specified magnification. In the step of specifying the combination, the combination is specified so that a magnification of the super-resolution processing of at least one of the color channels differs from a magnification of the super-resolution processing of other color channels of the color channels.

Advantageous Effects of Invention

According to the present invention, it is possible to speed up processing for generating one high resolution image from a low resolution multi-view input image group or a consecutive input image group that has a common partial region.

BRIEF DESCRIPTION OF DRAWINGS

FIG. 11 is a diagram illustrating a result of image processing of a green channel.

FIG. 16 is a diagram illustrating a result of image processing according to a first modified example for a green channel.

DESCRIPTION OF EMBODIMENTS

Figure 1:
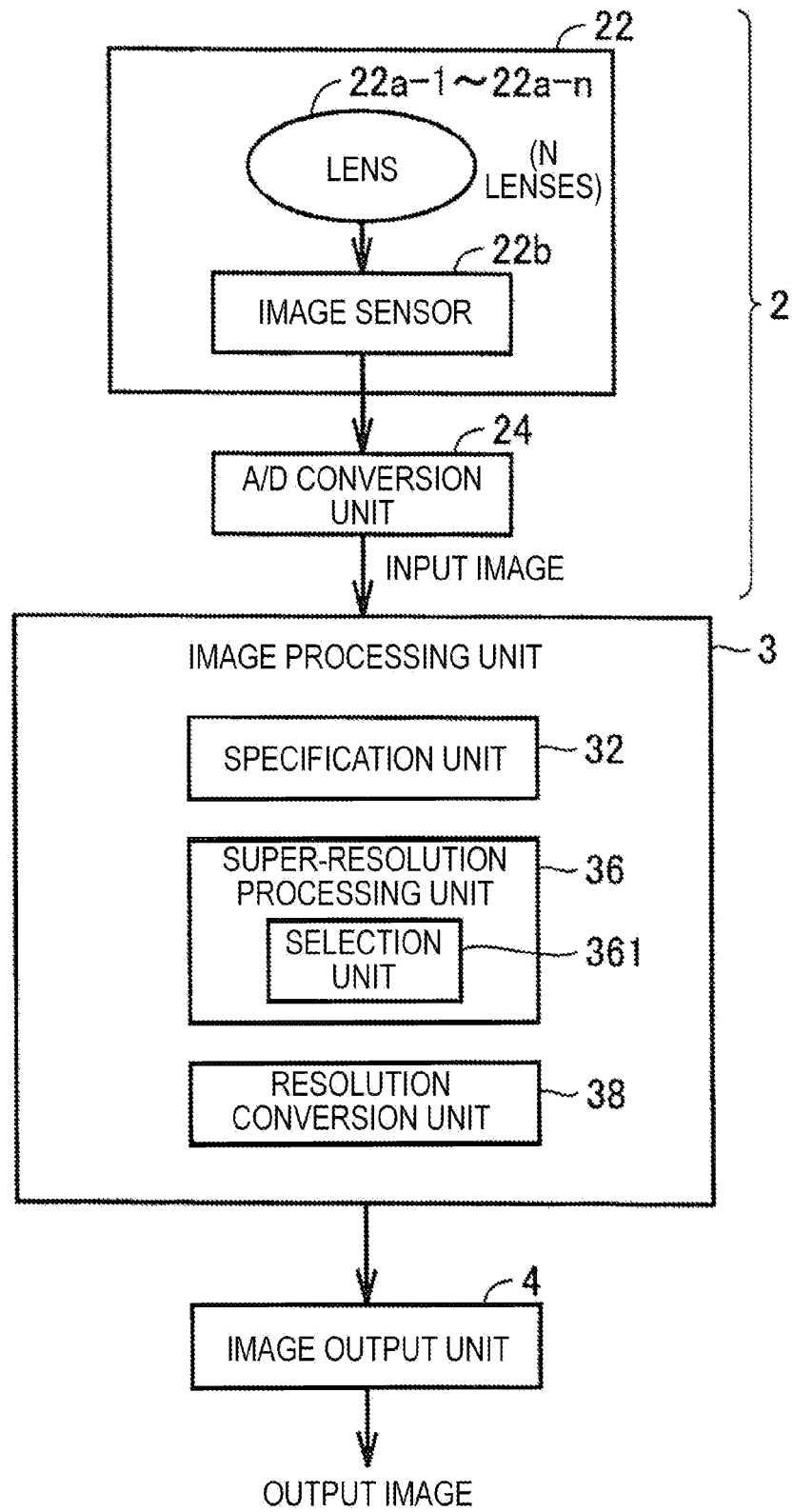
FIG. 1 is a block diagram illustrating a basic configuration of a configuration of an image processing apparatus according to an embodiment.

Embodiments of the present invention will be described below with reference to the drawings. In the following description, the same parts and components are assigned the same reference numerals. Their names and functions are also the same. Therefore, the descriptions thereof will not be repeated.

In the following examples, it is assumed to use, as an input image group, a plurality of captured images captured at the same time by an array camera having a plurality of lenses with different viewpoints. The input image group is, however, not limited to such captured images. The present invention is applicable so long as there is a partial region that is common to the images so as to obtain one high resolution image. As another example, a plurality of images captured at different timings and captured while shifting the viewpoints may be used.

<System Configuration>

FIG. 1 is a block diagram illustrating a basic configuration of a configuration of an image processing apparatus 1 according to the present embodiment.

Referring to FIG. 1, the image processing apparatus 1 includes an imaging unit 2, an image processing unit 3, and an image output unit 4. In the image processing apparatus 1 illustrated in FIG. 1, the imaging unit 2 obtains an image (hereinafter, also referred to as an "input image") by capturing an image of an object, and the image processing unit 3 performs below-described image processing on the obtained input image, thereby generating a high resolution output image (hereinafter, also referred to as a "high resolution image") having high frequency components more than those in the input image. Then, the image output unit 4 outputs this high resolution image to a display device or the like.

The imaging unit 2 captures an image of a target object (object) to generate an input image. More specifically, the imaging unit 2 includes a camera 22 and an analog to digital (A/D) conversion unit 24 connected to the camera 22. The A/D conversion unit 24 outputs the input image showing the object captured by the camera 22.

The camera 22, which serves as an optical system for capturing an image of an object, is an array camera. More specifically, the camera 22 includes lenses 22a-1 to 22a-n (the number of these lenses is n, and these are also referred to as a lens 22a as a representative) being arranged in a grid and having different viewpoints, and an image sensor 22b which is a device for converting an optical image formed by the lens 22a into an electric signal.

The A/D conversion unit 24 converts, into a digital signal, a video signal (an analog electric signal) showing an object that is output from the image sensor 22b, and outputs the digital signal. The imaging unit 2 can further include a control processing circuit for controlling each part of a camera, and the like.

The image processing unit 3 performs an image processing method according to the present embodiment, on the input image obtained by the imaging unit 2, thereby generating a high resolution image. More specifically, as described below, the image processing unit 3 includes a specification unit 32 for specifying a combination of a magnification of super-resolution processing and a magnification of resolution conversion processing for each color channel, a super-resolution processing unit 36 which serves as a first processing unit for performing super-resolution processing so that the input image has the specified magnification, and a resolution conversion unit 38 which serves as a second processing unit for performing resolution conversion processing so that the input image having been subjected to the super-resolution processing has the specified magnification. The super-resolution processing unit 36 may further include a selection unit 361 for selecting, from among input images, an input image to be used in the super-resolution processing, for each color channel of the input images.

The super-resolution processing unit 36 performs below-described super-resolution processing on an input image (or a selected input image). The super-resolution processing refers to processing for generating information of frequency exceeding Nyquist frequency of the input image. In addition, the resolution conversion unit 38 performs resolution conversion processing on the input image having been subjected to the super-resolution processing.

The image output unit 4 outputs a high resolution image generated by the image processing unit 3 to a display device or the like.

Although the image processing apparatus 1 illustrated in FIG. 1 can be constituted as a system in which each part is embodied by an independent device, generally, the image processing apparatus 1 is often embodied as a digital camera, a personal computer, and the like that are to be described below. Thus, as embodied examples of the image processing apparatus 1 according to the present embodiment, an embodied example of a digital camera and an embodied example of a personal computer (PC) will be described.

Figure 2:
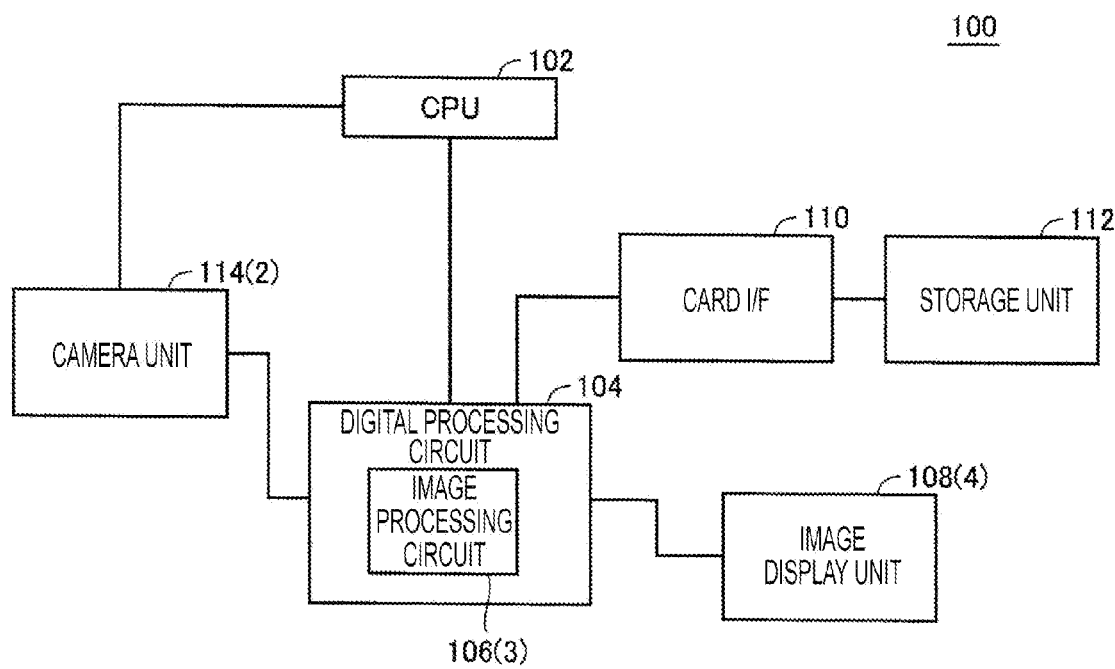
FIG. 2 is a block diagram illustrating a configuration of a digital camera that embodies an image processing apparatus.

FIG. 2 is a block diagram illustrating a configuration of a digital camera 100 that embodies the image processing apparatus 1 illustrated in FIG. 1. In FIG. 2, components corresponding to respective blocks constituting the image processing apparatus 1 illustrated in FIG. 1 are assigned the same reference numerals as those in FIG. 1.

Referring to FIG. 2, the digital camera 100 includes a central processing unit (CPU) 102, a digital processing circuit 104, an image display unit 108, a card interface (I/F) 110, a storage unit 112, and a camera unit 114.

The CPU 102 controls the entire digital camera 100 by executing a prestored program or the like. The digital processing circuit 104 executes various types of digital processing including image processing according to the present embodiment. The digital processing circuit 104 is typically formed by a digital signal processor (DSP), an application specific integrated circuit (ASIC), a large scale integration (LSI), a field-programmable gate array (FPGA), and the like. This digital processing circuit 104 includes an image processing circuit 106 for realizing a function provided by the image processing unit 3 illustrated in FIG. 1.

The image display unit 108 displays, for example, an input image provided by the camera unit 114, an output image generated by the digital processing circuit 104 (the image processing circuit 106), various types of setting information related to the digital camera 100, and a control graphical user interface (GUI) screen.

The card I/F 110 is an interface for writing image data generated by the image processing circuit 106 into the storage unit 112, or reading image data or the like from the storage unit 112. The storage unit 112 is a storage device for storing image data generated by the image processing circuit 106 and various types of information (setting values such as control parameters and operation modes of the digital camera 100). This storage unit 112 is formed by a flash memory, an optical disc, a magnetic disc, or the like, and stores data in a nonvolatile manner.

The camera unit 114 captured an image of an object to generate an input image.

The digital camera 100 illustrated in FIG. 2 implements the entire image processing apparatus 1 according to the present embodiment, as a single apparatus. In other words, a user can view a high resolution image in the image display unit 108 by capturing an image of an object using the digital camera 100.

Figure 3:
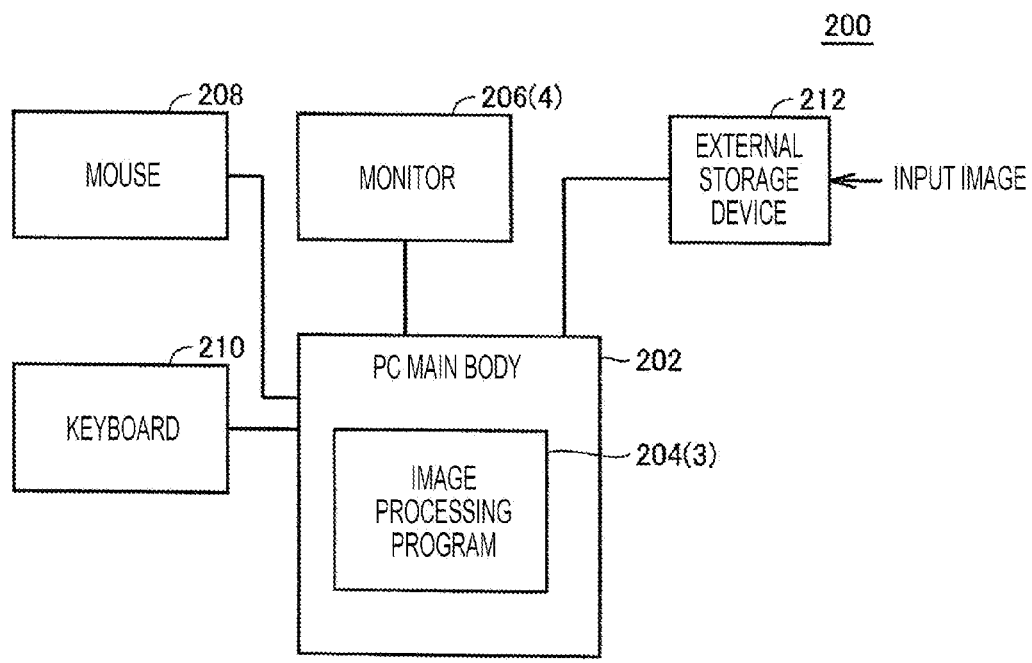
FIG. 3 is a block diagram illustrating a configuration of a personal computer (PC) that embodies an image processing apparatus.

FIG. 3 is a block diagram illustrating a configuration of a PC 200 that embodies the image processing apparatus 1 illustrated in FIG. 1. The PC 200 illustrated in FIG. 3 implements part of the image processing apparatus 1 according to the present embodiment as a single apparatus. The PC 200 illustrated in FIG. 3 is not equipped with an imaging unit 2 for obtaining an input image, and has such a configuration that an input image obtained by an arbitrary imaging unit 2 is input from outside. Even such a configuration can be included in the image processing apparatus 1 according to an embodiment of the present invention. In addition, also in FIG. 3, components corresponding to respective blocks constituting the image processing apparatus 1 illustrated in FIG. 1 are assigned the same reference numerals as those in FIG. 1.

Referring to FIG. 3, the PC 200 includes a PC main body 202, a monitor 206, a mouse 208, a keyboard 210, and an external storage device 212.

The PC main body 202 is typically a general-purpose computer according to a general-purpose architecture, and includes a CPU, a random access memory (RAM), a read-only memory (ROM), and the like, as basic components. The PC main body 202 can execute an image processing program 204 for realizing a function provided by the image processing unit 3 illustrated in FIG. 1. Such an image processing program 204 is distributed with being stored in a storage medium such as a compact disk-read only memory (CD-ROM), or delivered from a server apparatus via a network. Then, the image processing program 204 is stored into a storage area such as a hard disc of the PC main body 202.

The image processing program 204 as described above may be configured to call necessary modules among program modules provided as part of an operating system (OS) to be executed by the PC main body 202, at predetermined timings and in a predetermined order to execute processing. In this case, the image processing program 204 itself does not include modules provided by the OS, and image processing is realized in cooperation with the OS. In addition, the image processing program 204 may not be an independent program, and may be provided with being incorporated into part of a certain program. In this case as well, the image processing program 204 itself does not include modules commonly-used in the certain program, and image processing is realized in cooperation with the certain program. Even the image processing program 204 that does not include part of modules as described above does not depart from the purpose of the image processing apparatus 1 according to the present embodiment.

It should be appreciated that part or all of functions provided by the image processing program 204 may be realized by dedicated hardware.

The monitor 206 displays a GUI screen provided by an operating system (OS), an image generated by the image processing program 204, and the like.

The mouse 208 and the keyboard 210 each receive a user operation, and output the content of the received user operation to the PC main body 202.

The external storage device 212 stores an input image obtained by a certain method, and outputs this input image to the PC main body 202. As the external storage device 212, a device that stores data in a nonvolatile manner, such as a flash memory, an optical disc, and a magnetic disc, is used.

Figure 4A:
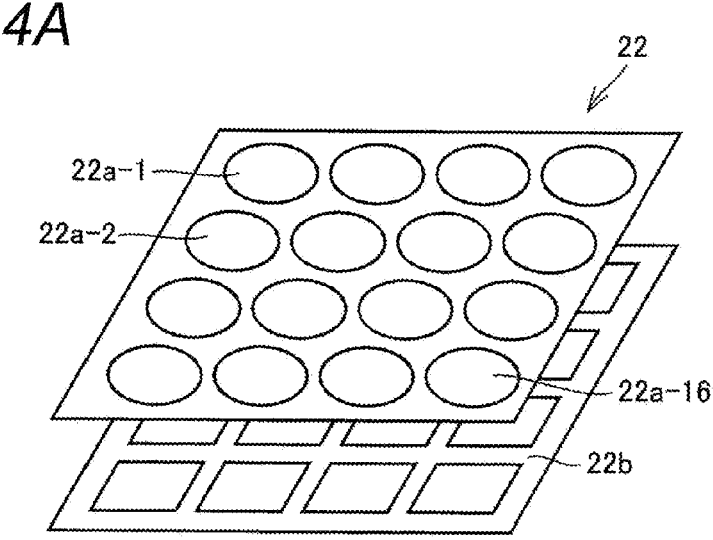
FIG. 4A is a diagram illustrating an overview of a configuration of a camera.
Figure 4B:
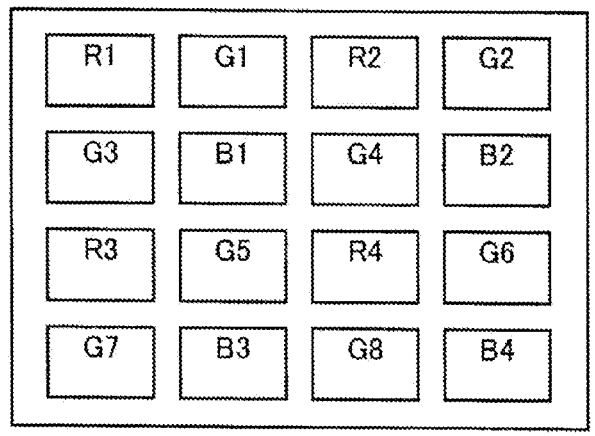
FIG. 4B is a diagram illustrating a specific example of an optical image input on an image sensor.

FIG. 4A is a diagram illustrating an overview of a configuration of the camera 22. FIG. 4B is a diagram illustrating a specific example of an optical image input on the image sensor 22b. Referring to FIG. 4A, as an example, the camera 22 is an array camera, and includes 16 lenses 22a-1 to 22a-16 arranged in a grid. The intervals (base-line length) between the lenses 22a-1 to 22a-16 are assumed to be uniform both in longitudinal and transverse directions. Referring to FIG. 4B, each optical image formed by a corresponding lens 22a is input on the image sensor 22b through a color filter of a single color. Thus, an optical image from one lens 22a becomes an image of a color channel of a single color. In other words, one input image has a color channel of a single color.

A color filter arranged in the imaging unit 2 includes a plurality of colors. One lens 22a corresponds to one color (any of red, green, and blue (RGB)). Color filters are arranged in the imaging unit 2 according to a Bayer arrangement or the like so that the lenses 22a each have different colors. For example, as illustrated in FIG. 4B, color filters of three colors, i.e., red (R), green (G), and blue (B) are assumed to be arranged in a Bayer arrangement. In FIG. 4B, an image assigned "R" denotes a red channel image input through an R filter, an image assigned "B" denotes a blue channel image input through a B filter, and an image assigned "G" denotes a green channel image input through a G filter.

In this manner, an input image group obtained by the imaging unit 2 is a multi-view input image group having a plurality of color channels and having a common partial region, and has a color channel of a single color for each input image. In addition, as illustrated in FIG. 4B, in some cases, the number of input images for each color channel may not be uniform in an input image group. In the example illustrated in FIG. 4B, a green channel has 8 input images, whereas a red channel and a blue channel each have 4 input images.

In addition, color channels are not limited to the above-described red, green, and blue (R, G, and B) channels. Color channels may be the ones of other colors such as, for example, cyan, magenta, and yellow (C, M, and Y) that are input in a case in which complementary filters of R, G, and B are used.

<Operation Overview>
(Description of Issue)

Figure 5:
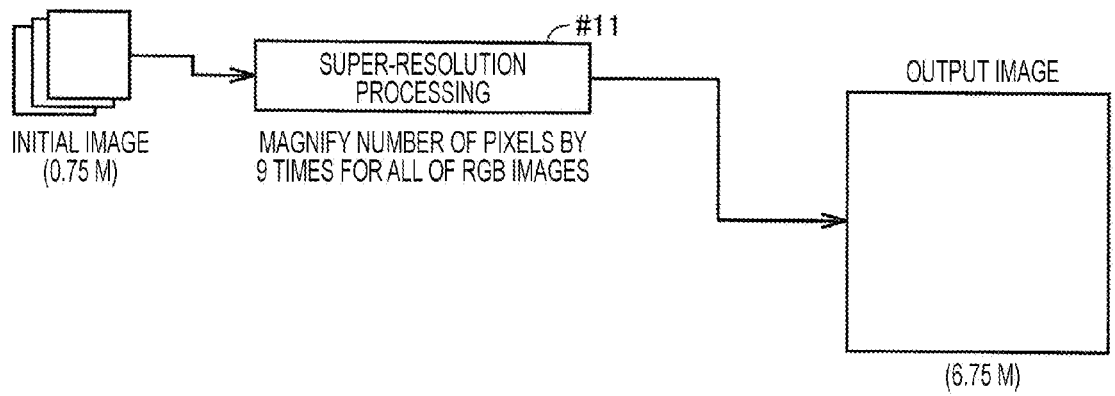
FIG. 5 is a diagram illustrating a flow of image processing in an image processing apparatus that performs conventional super-resolution processing.

FIG. 5 is a diagram illustrating a flow of image processing in an image processing apparatus that performs conventional super-resolution processing. As illustrated in FIG. 5, in a conventional image processing apparatus, super-resolution processing is performed so that the number of pixels in each input image is magnified by a pre-fixed magnification (9 times in the example illustrated in FIG. 5). In the conventional super-resolution processing, the total number of pixels for each color channel in an input image group (initial image) is assumed to be the same number of pixels. In a case in which color filters are arranged so that the lenses 22a each have different colors as illustrated in FIGS. 4A and 4B, "the total number of pixels for each color channel" is obtained by (the number of pixels for one input image)×(the number of input images of a target color channel). In the case of the example illustrated in FIG. 5, the number of pixels in an input image for each color channel is magnified by 9 times through the super-resolution processing. Thus, when the same number of input images each having the number of pixels of 0.75 M (for example, 1000×750 pixels) are input, the number of pixels in a high resolution output image for each color channel is 6.75 M (for example, 3000×2250 pixels).

The total number of pixels in input images becomes input information of super-resolution processing. Thus, if each input image is magnified up to the above-described total number of pixels, a high resolution image maintained at appropriate image quality is obtained. If, however, each input image is magnified to the number of pixels larger than the total number of pixels, the image quality does not increase so much as decrease in processing speed. As exemplified below, the inventor has actually performed super-resolution processing for magnifying an input image to the number of pixels larger than the total number of pixels in input images, and found out that gradation characteristics in the input image are lost in an output image, and the image quality decreases instead.

At this time, in some input image groups, the number of input images varies depending on a color channel as described above. In other words, in some cases, the total number of pixels for each color channel may vary. When all of these input images are used in the conventional super-resolution processing illustrated in FIG. 5, if a magnification of the super-resolution processing is fixed based on the total number of pixels in input images of a green channel, in which the total number of pixels (the number of input images) is large, in red and blue channels, each of which is a color channel in which the total number of pixels (the number of input images) is small, input images are magnified too much.

(Operation Overview)

In view of the foregoing, in the image processing apparatus 1 according to the present embodiment, a magnification of super-resolution processing is specified for each color channel. In other words, in the image processing apparatus 1, depending on the total number of pixels in input images for each color channel, super-resolution processing is performed at a different magnification according to a color channel. Furthermore, the image processing apparatus 1 performs, on the input image having been subjected to super-resolution processing, resolution conversion processing at a magnification according to a magnification of the super-resolution processing so as to equalize the number of pixels in an output image of each color channel. In other words, in the image processing apparatus 1 according to the present embodiment, a combination of a magnification of super-resolution processing and a magnification of resolution conversion processing is specified for each color channel, and the respective types of processing are executed at the respective specified magnifications.

<Operation Flow>

(Overall Operation)

Figure 6:
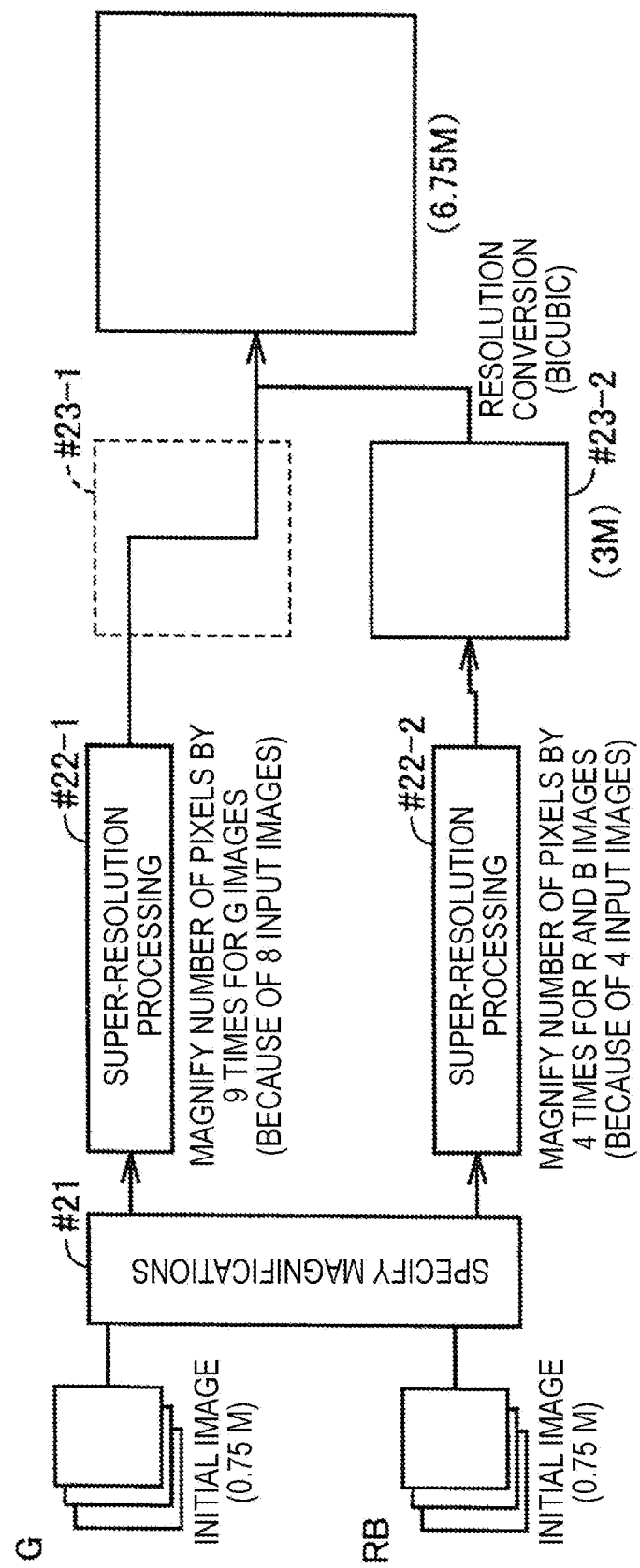
FIG. 6 is a diagram illustrating a flow of image processing in an image processing apparatus according to an embodiment.

FIG. 6 is a diagram illustrating a flow of image processing in the image processing apparatus 1 according to the present embodiment. Referring to FIG. 6, in the image processing apparatus 1, with respect to an input image group, a combination of a magnification of super-resolution processing and a magnification of resolution conversion processing is specified for each color channel according to the number of input images of each color channel (the total number of pixels in each color channel) (step #21). Then, super-resolution processing is executed on input images of each color channel at a corresponding magnification (step #22). Furthermore, resolution conversion processing is executed on the input images having been subjected to the super-resolution processing at a corresponding magnification (step #23).

In a case in which the input image group as illustrated in FIG. 4B is input, i.e., in a case in which 8 low resolution (for example, 1000×750 pixels) input images of a green channel, and 4 input images for each of red and blue channels are input, in the above-described step #21, for example, for the green channel, a magnification of the number of pixels of super-resolution processing is specified as 9 times (i.e., 3 times in each of longitudinal and transverse directions) and a magnification of the number of pixels of resolution conversion processing is specified as 1 time (1 time in each of longitudinal and transverse directions, i.e., no resolution conversion processing), and for red and blue channels, a magnification of the number of pixels of super-resolution processing is specified as 4 times (i.e., 2 times in each of longitudinal and transverse directions) and a magnification of the number of pixels of resolution conversion processing is specified as 2.25 times (i.e., 1.5 times in each of longitudinal and transverse directions).

Since 8 input images each having the number of pixels of 0.75 M (for example, 1000×750 pixels) are input, a magnification of super-resolution processing for the green channel is calculated as 9 times (i.e., 3 times in each of longitudinal and transverse directions) so as to obtain an integer square multiple closest to 8 times. Alternatively, the magnification may be calculated as 8 times (i.e., 2√2 times in each of longitudinal and transverse directions) so as to make the number of pixels in an output image exactly the same as the total number of pixels in input images. In this case, the number of pixels obtained after super-resolution processing reaches the total number of pixels in input images. Thus, a magnification of resolution conversion is specified as 1 time. In other words, for the green channel for which a magnification of super-resolution processing is specified as the highest magnification, it is specified that no resolution conversion is to be performed.

In a similar manner, a magnification of super-resolution processing of each of the red and blue channels is specified as 4 times (i.e., 2 times in each of longitudinal and transverse directions) since 4 input images are input for each of the red and blue channels. Furthermore, a magnification of resolution conversion processing is calculated so as to match the number of pixels in an output image with the number of pixels in the green channel, in which a magnification of super-resolution processing is the highest magnification. In other words, in the case of this example, a magnification of resolution conversion processing is calculated so as to magnify the number of pixels of 3 M, which corresponds to the number of pixels in an input image of each of the red and blue channels that is obtained after super-resolution processing, up to the number of pixels of 6.75 M (for example, 3000×2250 pixels), which corresponds to the number of pixels in the green channel that is obtained after super-resolution processing.

In addition, the inventor finds out, as a result of performing super-resolution processing at various magnifications, that it is effective from the viewpoint of image quality and processing speed to set a magnification of super-resolution processing so that the number of pixels in an output image (a high resolution image) falls within the range of ±30% from the total number of pixels in input images.

In a case in which the image processing apparatus 1 is implemented in the digital camera 100 as illustrated in FIG. 2, the number of images (the total number of pixels) in each channel in an input image group is fixed according to the characteristics of the camera unit 114. Thus, a combination of a magnification of super-resolution processing and a magnification of resolution conversion processing may be predetermined for each color channel. Alternatively, in a case in which the camera unit 114 is interchangeable, or the arrangement of color filters is modifiable, and in a case in which modifiable characteristics are known in advance, several combinations of a magnification of super-resolution processing and a magnification of resolution conversion processing may be pre-registered for each color channel in the image processing apparatus 1, and a combination may be selected according to the characteristics of the camera unit 114. Yet alternatively, in a case in which the image processing apparatus 1 is embodied by the PC 200 as illustrated in FIG. 3, since various input image groups are to be processed, a conversion formula for calculating a combination of a magnification of super-resolution processing and a magnification of resolution conversion processing according to the total number of pixels for each color channel in an input image group and a ratio of the total number of pixels of each color channel may be prestored, and a combination may be specified through calculation using the conversion formula.

If a combination of a magnification of super-resolution processing and a magnification of resolution conversion processing is specified in the above-described step #21 for each of the green, red, and blue channels as described above, super-resolution processing for magnifying the number of pixels by 9 times (i.e., 3 times in each of longitudinal and transverse directions) is performed on an input image of the green channel (step #22-1). In addition, super-resolution processing for magnifying the number of pixels by 4 times (i.e., 2 times in each of longitudinal and transverse directions) is performed on an input image of each of the red and blue channels (step #22-2).

Furthermore, resolution conversion processing for magnifying the number of pixels by 1 time (i.e., 1 time in each of longitudinal and transverse directions) is performed on the input image of the green channel that has been subjected to the super-resolution processing (step #23-1). At this time, "execution of resolution conversion processing by 1 time" unit not changing the resolution, and includes not performing resolution processing. In addition, resolution conversion processing for magnifying the number of pixels by 2.25 times (i.e., 1.5 times in each of longitudinal and transverse directions) is performed on the input image of each of the red and blue channels that has been subjected to the super-resolution processing (step #23-2).

(Super-Resolution Processing)

Figure 7:
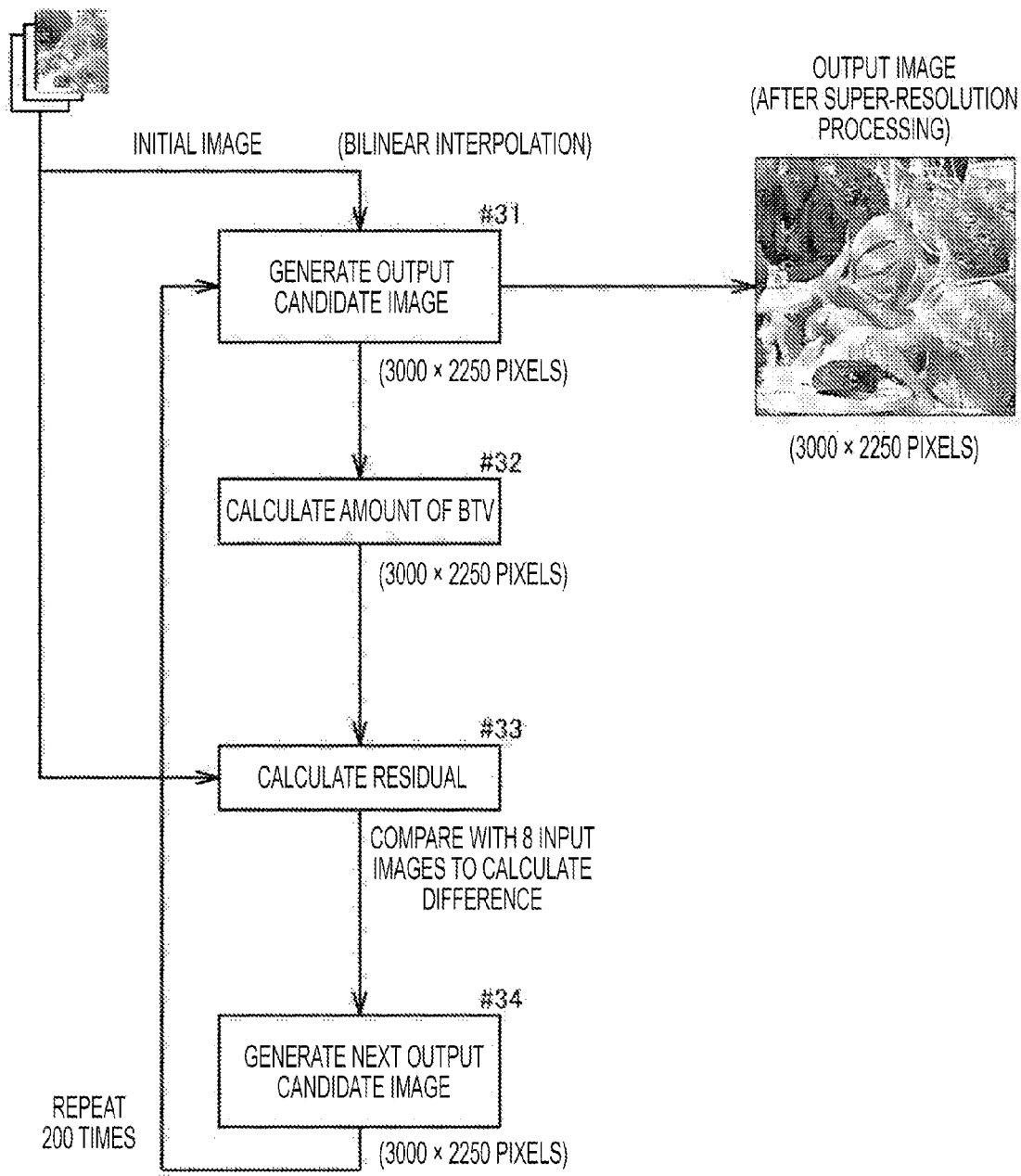
FIG. 7 is a diagram illustrating a flow of super-resolution processing.

FIG. 7 is a diagram illustrating a flow of super-resolution processing. In particular, FIG. 7 illustrates a specific example of a super-resolution image for the input image of the green channel in step #22-1. As a specific example, FIG. 7 illustrates a flow of super-resolution processing of a case in which processing described in the article "Fast and Robust Multiframe Super Resolution" (IEEE TRANSACTIONS ON IMAGE PROCESSING, VOL. 13, NO. 10 Oct. 2004, pages. 1327-1344) is performed.

Referring to FIG. 7, in step #31, interpolation processing such as bilinear interpolation is performed on one input image among 8 input images of a green channel to convert a resolution of the input image into a high resolution, which corresponds a resolution obtainable after super-resolution processing, thereby generating an output candidate image as an initial image.

In step #32, an amount of bilateral total variation (BTV) which is a constraint term for noise-robust convergence is calculated.

Figure 8:
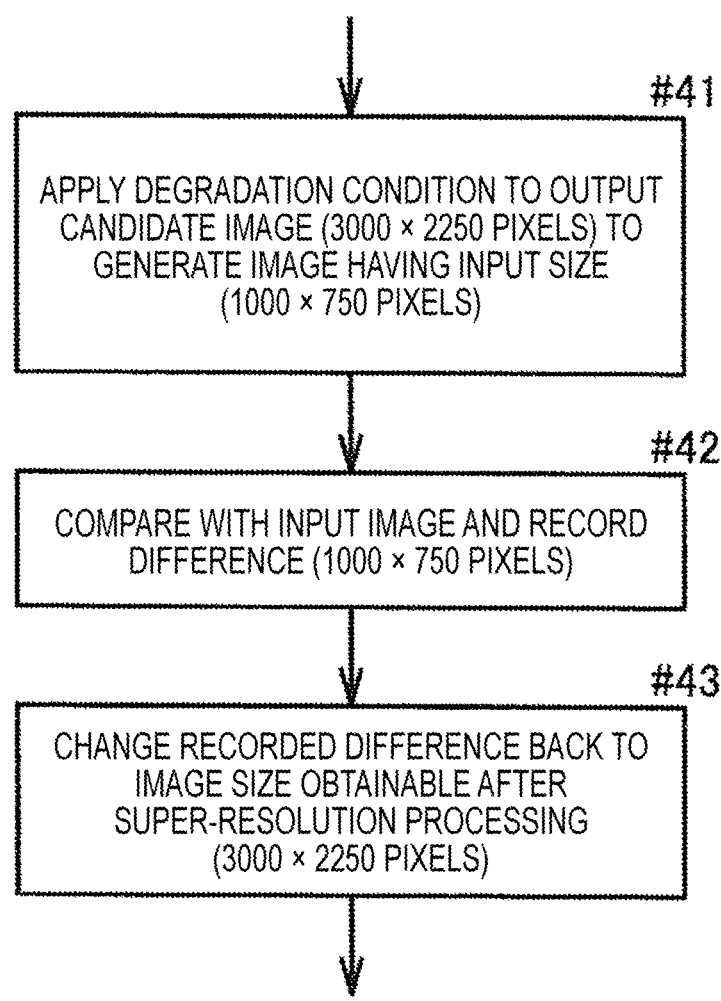
FIG. 8 is a diagram illustrating details of processing in step #33 in FIG. 7.

In step #33, the above generated output candidate image is compared with the 8 input images of the green channel to calculate a residual. FIG. 8 is a diagram illustrating details of processing in step #33. More specifically, referring to FIG. 8, in step #33, the above generated output candidate image is converted into an image having the size of the input image (changed into a low resolution image), based on each input image and degradation information thereof (information indicating the relationship between a super-resolution processed image and an input image) (#41). Then, the difference between the image and the 8 input images is calculated, and recorded (#42). Subsequently, the calculated difference is changed back to the size obtainable after super-resolution processing (#43) to be calculated as a residual.

In step #34, the calculated residual and the amount of BTV are subtracted from the output candidate image generated in the above-described step #31, thereby generating a next output candidate image.

The processing in the above-described steps #31 to #34 is repeated until output candidate images converge, and a converged output candidate image is output as a super-resolution processed output image of the green channel.

The number of repetitions may be a predetermined number of times such as a number of times for approximately-enough convergence (e.g., 200 times). Alternatively, convergence determination may be performed every time a series of processes is performed, and repetition may be made according to the result of such convergence determination.

The super-resolution processing in FIG. 7 is performed for each color channel. In the above example, in the cases of red and blue channels, the super-resolution processing is performed on 4 images for each channel. In the cases of red and blue channels, in the above-described step #31, an output candidate image having the number of pixels of 3 M (for example, 2000×1500 pixels) is generated. Thus, in convergence calculation in the above-described steps #31 to #34, an image having the number of pixels of 3 M is handled.

Figure 9:
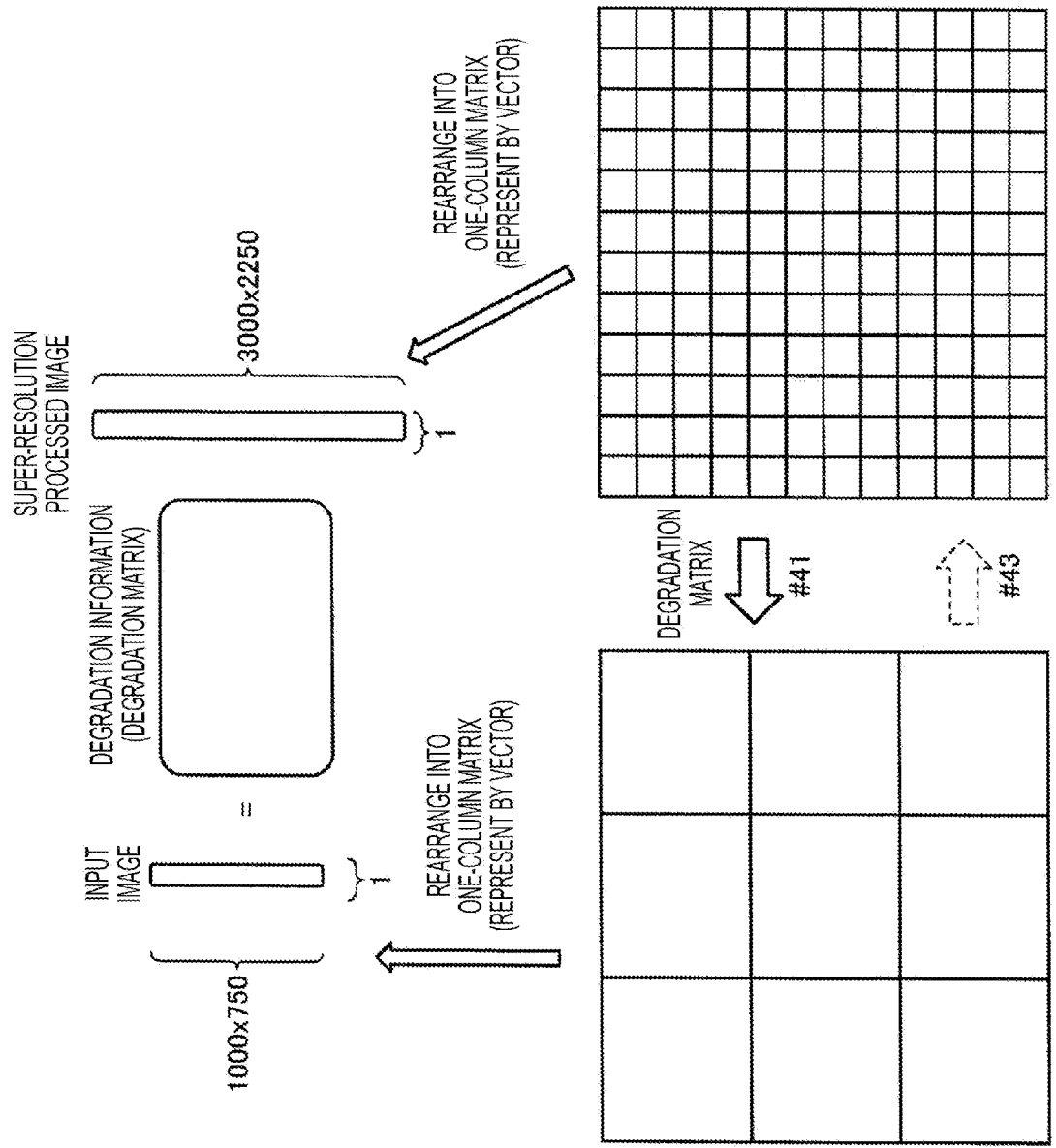
FIG. 9 is a diagram for illustrating degradation information used in step #41 in FIG. 8.

FIG. 9 is a diagram for illustrating degradation information used in the above-described step #41.

The degradation information refers to information indicating the relationship of each input image with respect to a high resolution image obtainable after super-resolution processing, and is represented in a matrix form, for example. The degradation information includes a subpixel-level shift amount (decimal amount of parallel-moved remaining pixels), a down-sampling amount, a blurring amount, and the like of each input image.

Referring to FIG. 9, in a case in which an input image and a high resolution image obtainable after super-resolution processing are each represented by one-dimensional vector, degradation information is defined by a matrix indicating the conversion thereof.

Figure 10:
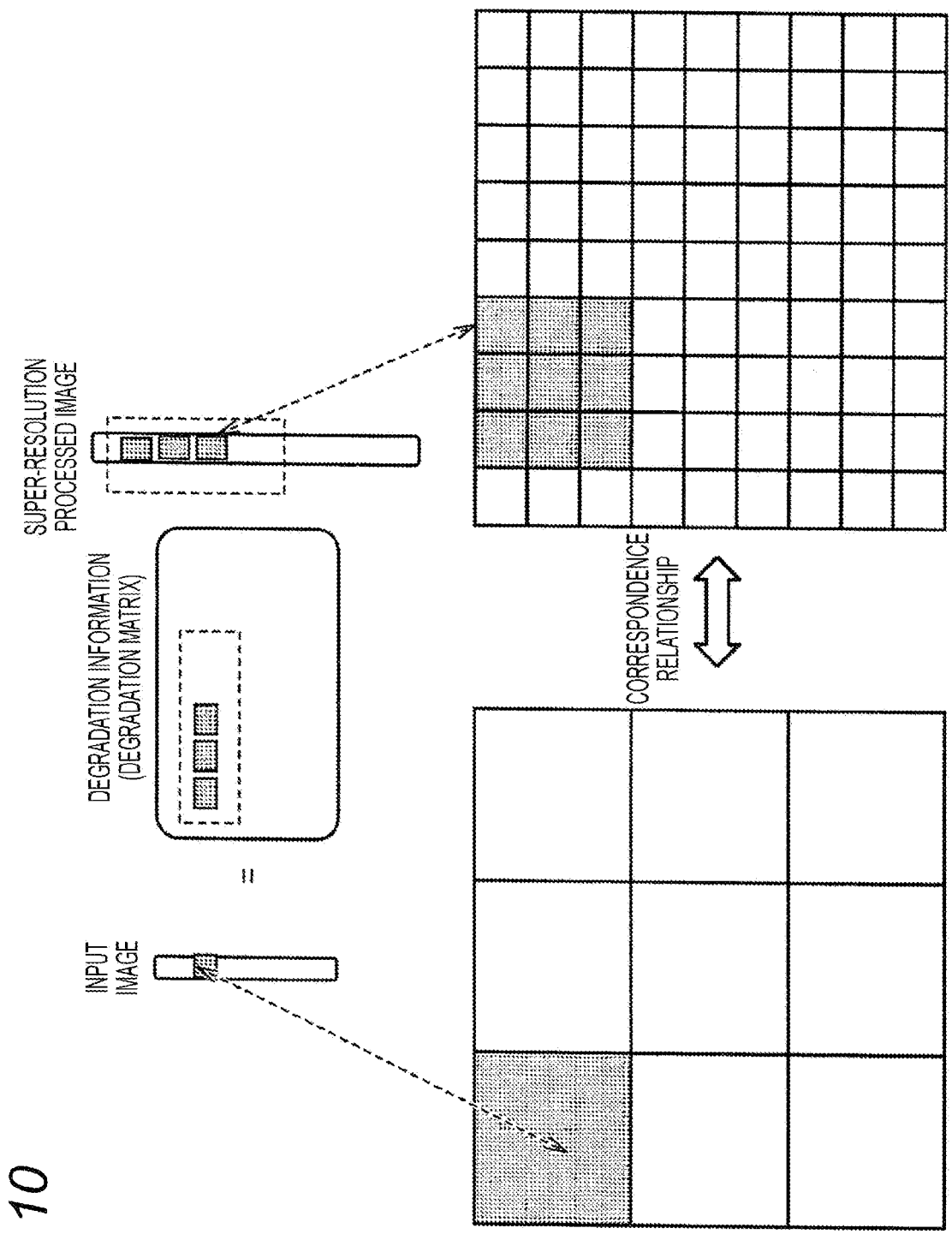
FIG. 10 is a diagram illustrating a specific example of deterioration information.

FIG. 10 is a diagram illustrating a specific example of deterioration information.

Referring to FIG. 10, as degradation information, a shift amount of a pixel is defined as ⅓ pixel, and a down-sampling amount is defined as ⅓ in each of longitudinal and transverse directions. When 1 point corresponding to 1 pixel in an input image corresponds to 9 points corresponding to 9 pixels in a high resolution image obtained after super-resolution processing, in the degradation information, a coefficient of ⅑ is described at 9 points. Thus, when a shift amount of a pixel is ⅓ pixel, ⅑ of the shift amount contributes to each of 9 pixels in the high resolution image.

In addition, in FIG. 10, for the simplicity of description, a blurring amount is assumed to be 0. Nevertheless, if a blurring amount is not 0, a point spread function (PSF) may be used as a parameter indicating a blurring amount.

Effect of Embodiment

FIGS. 11 to 14A and 14B are diagrams each illustrating a comparison between an output image obtained as a result of actually performing the above-described image processing on the input image group illustrated in FIG. 4(B) using the image processing apparatus 1 according to the present embodiment and an output image obtained as a result of actually performing conventional image processing. In addition, in the image processing illustrated in these drawings, blurring recovery is also performed using a PSF serving as a parameter indicating a blurring amount caused by lens characteristics. The same applies to subsequent examples.

FIG. 11 illustrates a result of image processing of a green channel. In input images of the green channel, since the total number of pixels is the highest number, a magnification of super-resolution processing is the highest magnification. Thus, in both of the image processing according to the present embodiment and the conventional image processing, super-resolution processing of 9 times (i.e., 3 times in each of longitudinal and transverse directions) is similarly performed on one input image among the input images of the green channel, so that the same output images are obtained.

In contrast, for each of red and blue channels, each of which has the total number of pixels smaller than that of the green channel, results as illustrated in FIGS. 12A and 12B to 14A and 14B are obtained. More specifically, FIGS. 12A and 12B and 14A and 14B illustrate comparisons between, for red and blue channels, respectively, an output result (A) obtained in a case in which super-resolution processing of 9 times (i.e., 3 times in each of longitudinal and transverse directions), which is conventional super-resolution processing, is performed on one input image among input images of a corresponding channel, and an output result (B) obtained in a case in which super-resolution processing of 4 times (i.e., 2 times in each of longitudinal and transverse directions), which is super-resolution processing according to the present embodiment, is performed and resolution conversion is subsequently performed so as to perform processing for magnifying the number of pixels by 9 times (i.e., 3 times in each of longitudinal and transverse directions) on the original input image.

Figures 12A, 12B:
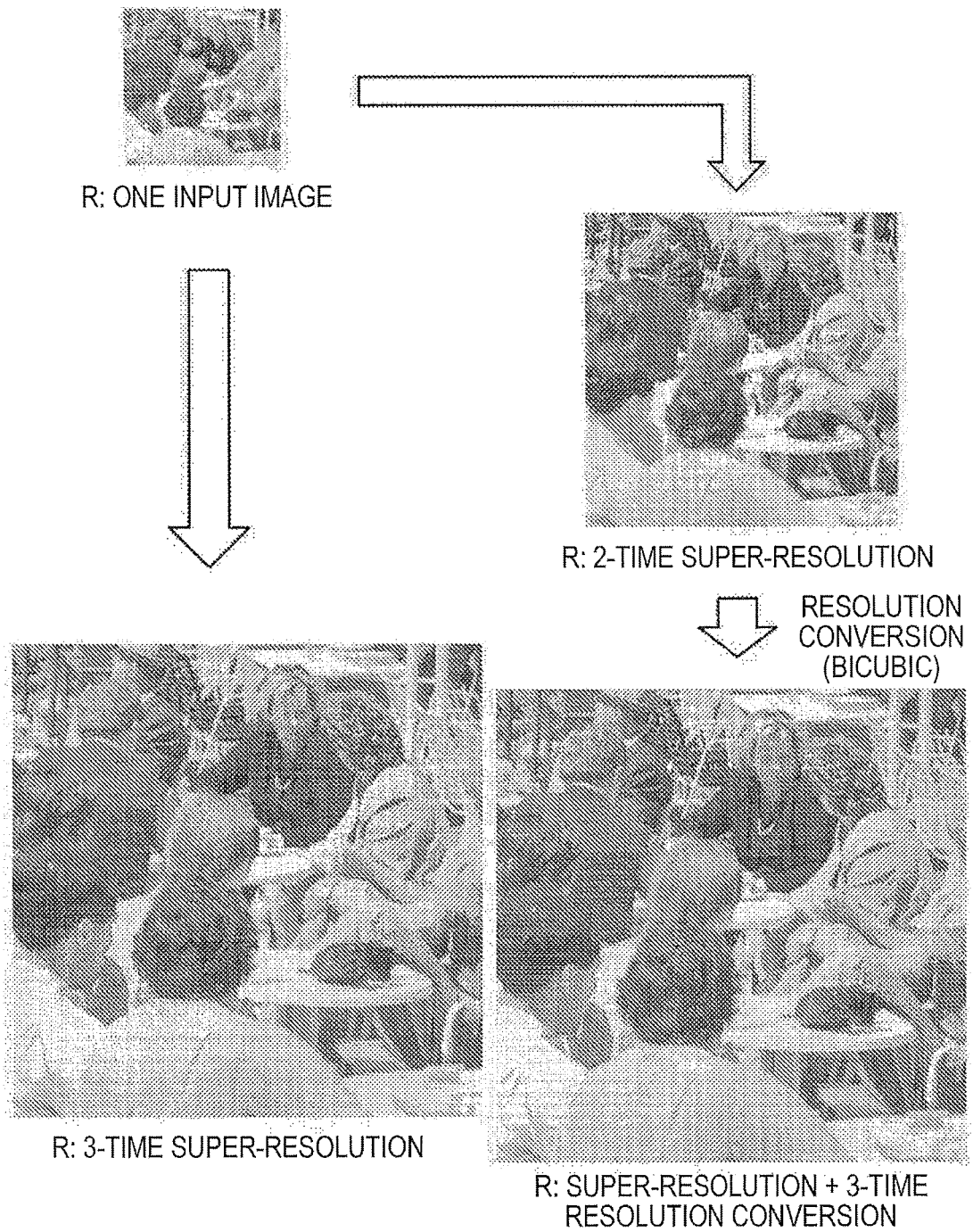
FIGS. 12A and 12B are diagrams illustrating a comparison between, for a red channel, an output result 12A obtained in a case in which conventional super-resolution processing is performed and an output result 12B obtained in a case in which image processing according to an embodiment is performed.
Figures 14A, 14B:
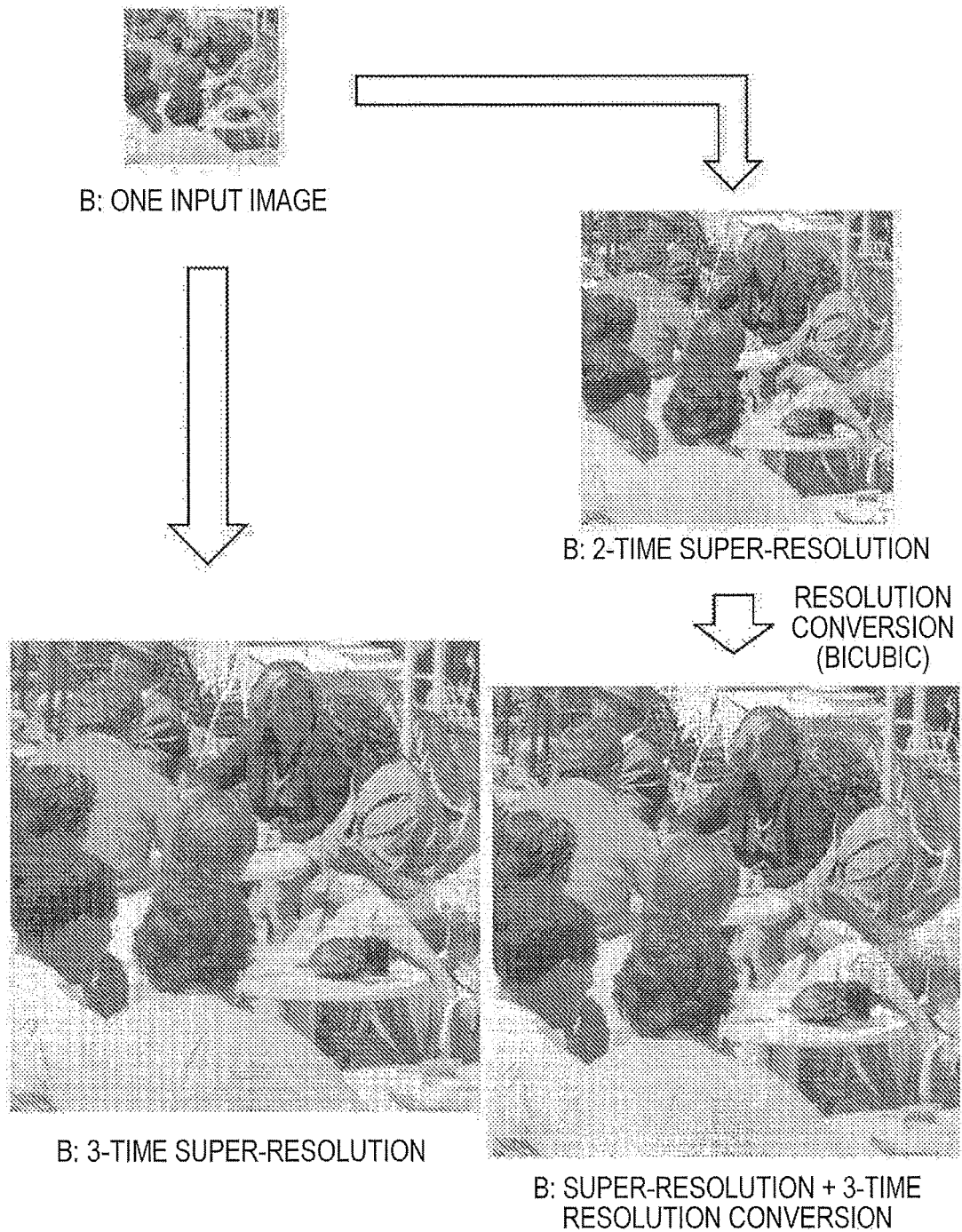
FIGS. 14A and 14B are diagrams illustrating a comparison between, for a blue channel, an output result 14A obtained in a case in which conventional super-resolution processing is performed and an output result 14B obtained in a case in which image processing according to an embodiment is performed.

When FIGS. 12A and 14A are compared with FIGS. 12B and 14B, respectively, it can be seen that output images (FIGS. 12B and 14B) obtained as a result of performing the image processing according to the present embodiment are sharper than output images (FIGS. 12A and 14A) obtained as a result of performing the conventional image processing.

Figure 13A:
FIG. 13A is an enlarged view of a portion of an output image in FIG. 12A.
Figure 13B:
FIG. 13B is an enlarged view of a portion of an output image in FIG. 12B.

FIGS. 13A and 13B are enlarged views of portions of the output images in FIGS. 12A and 12B, respectively. As illustrated in the comparison between FIGS. 13A and 13B, in a case in which the amount of BTV is used as a constraint term, if super-resolution processing of 9 times (i.e., 3 times in each of longitudinal and transverse directions) is performed in spite of the total number of pixels in input images being 4 times as large as the number of pixels in one input image (FIG. 13A), oversaturation as a side effect of a bilateral filter progresses. Consequently, it can be seen that gradation change is lost like coloring.

Accordingly, as indicated by this output result, it has been found out that, in a case in which an input image group has a plurality of color channels, and input images each have a common partial region, and furthermore, the total number of pixels is not uniform among color channels, through image processing according to the present embodiment, image quality of an output image especially for a color channel in which the total number of pixels is smaller can be improved much more than conventional image processing does.

In addition, in super-resolution processing, if a magnification is set lower, the number of pixels obtainable after super-resolution processing can be made smaller (by setting a magnification at 2 times instead of 3 times, the number of pixels obtainable after super-resolution processing becomes half or less). Thus, for a color channel in which the total number of pixels is smaller, processing time required for super-resolution processing can also be shortened in approximately proportion to the number of pixels obtainable after super-resolution processing. For this reason, in a case in which an input image group has a plurality of color channels, and input images each have a common partial region, and furthermore, the total number of pixels is not uniform among color channels, if the image processing according to the present embodiment is used as processing for obtaining a high resolution image, processing speed can be enhanced much more than conventional image processing does.

First Modified Example

Figure 15:
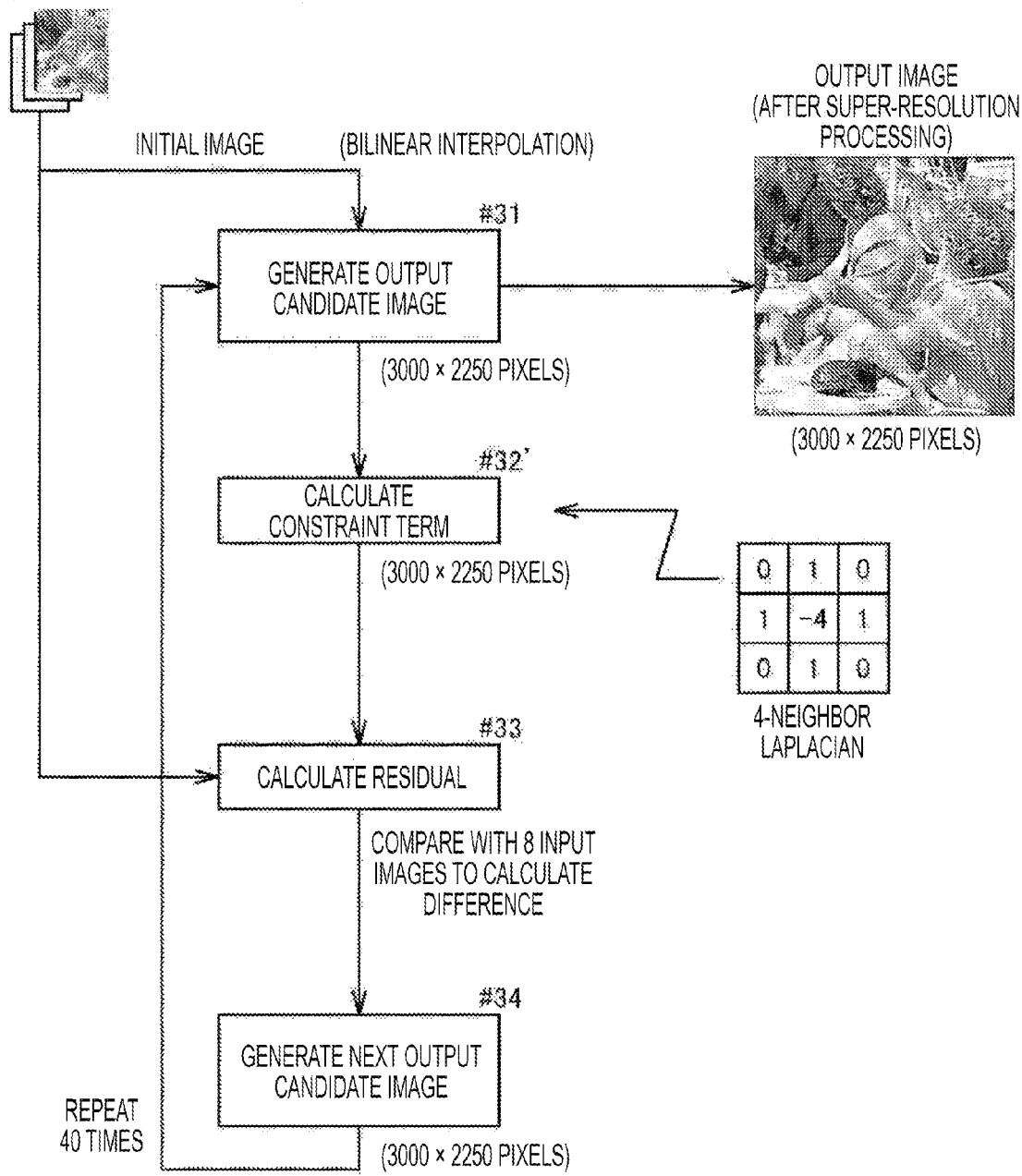
FIG. 15 is a diagram illustrating another example of super-resolution processing.
Figures 17A, 17B:
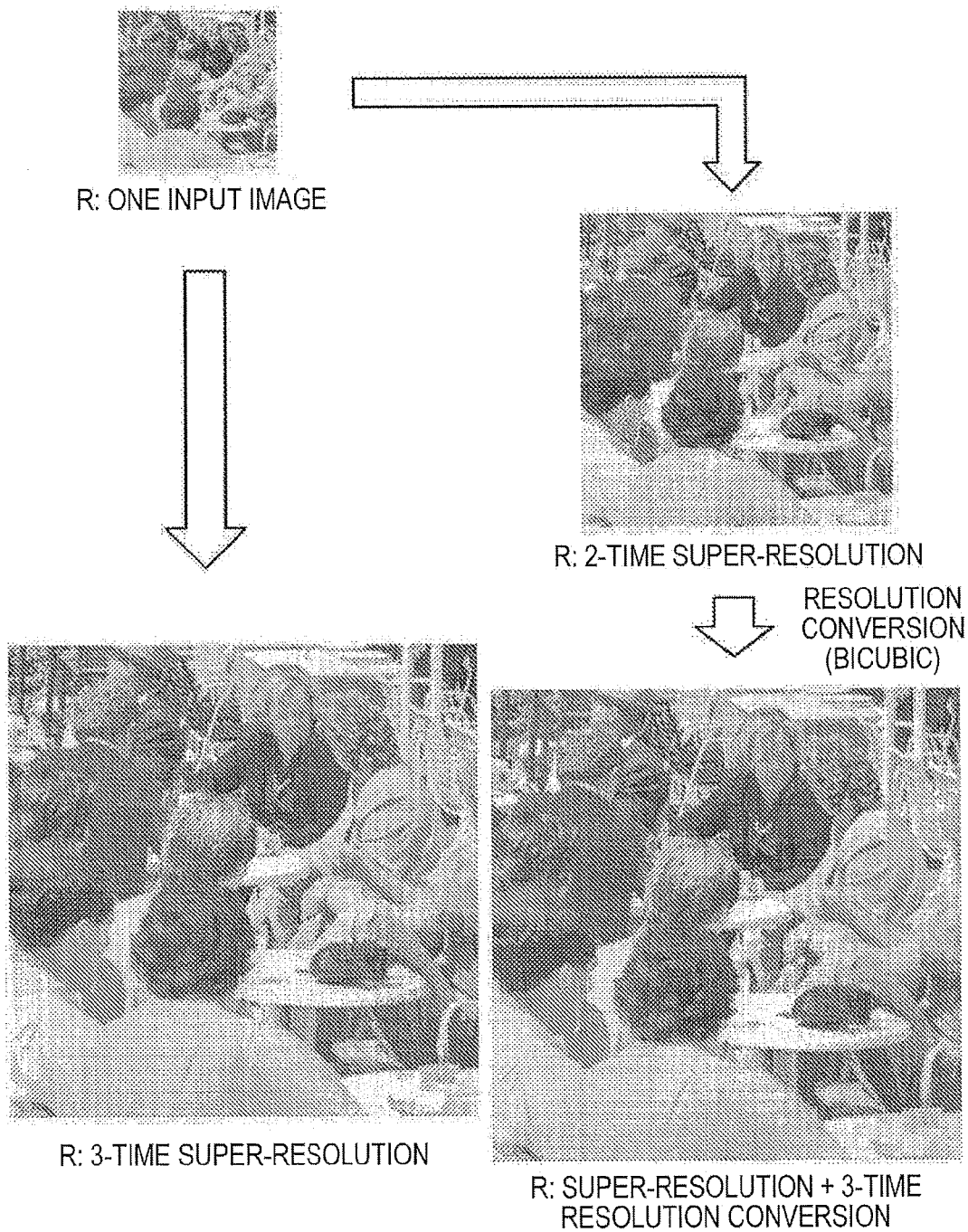
FIGS. 17A and 17B are diagrams illustrating a comparison between, for a red channel, an output result 17A obtained in a case in which conventional super-resolution processing is performed and an output result 17B obtained in a case in which image processing according to the first modified example is performed.
Figures 18A, 18B:
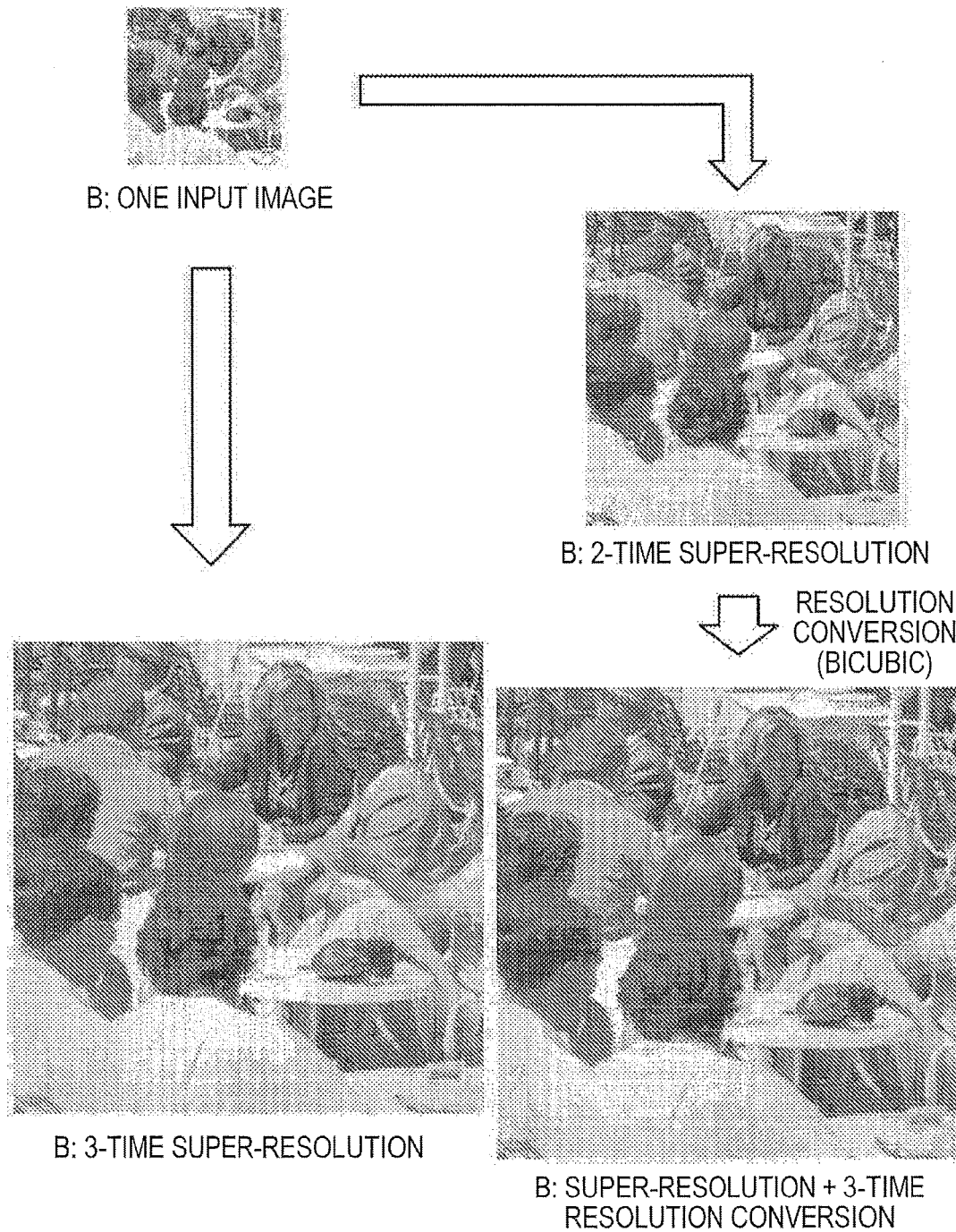
FIGS. 18A and 18B are diagrams illustrating a comparison between, for a blue channel, an output result 18A obtained in a case in which conventional super-resolution processing is performed and an output result 18B obtained in a case in which image processing according to the first modified example is performed.

In addition, super-resolution processing in the above-described step #22 is not limited to the processing illustrated in FIG. 7, and other types of processing may be employed so long as the processing is reconstruction-type super-resolution processing for generating one image from a plurality of input images. FIG. 15 is a diagram illustrating another example of super-resolution processing. More specifically, referring to FIG. 15, as a constraint term calculated in the above-described step #32, a constraint term other than the amount of BTV, such as, for example, a 4-neighbor Laplacian may be used (step #32').

FIGS. 16 to 18A and 18B are diagrams each illustrating a comparison between an output image obtained as a result of actually performing the above-described image processing on the input image group illustrated in FIG. 4B using an image processing apparatus 1 according to the first modified example and an output image obtained as a result of actually performing conventional image processing. FIGS. 16 to 18A and 18B illustrate comparisons for green, red and blue channels, respectively.

Referring to FIG. 16, in this example as well, for the green channel, the same output images are obtained both in the image processing according to the first modified example and the conventional image processing. In addition, referring to FIGS. 17A and 17B and 18A and 18B, for the red and blue channels, in these examples, a difference in image quality so predominant as illustrated in FIGS. 12A and 12B and 14A and 14B is not seen. Accordingly, it has been found out that, in the image processing according to the first modified example in which a constraint term other than the amount of BTV, such as a 4-neighbor Laplacian, is used, prominent improvement in image quality from that in the conventional image processing cannot be obtained as much as the above-described image processing using the amount of BTV.

Nevertheless, even in the image processing according to the first modified example, for a color channel in which the total number of pixels is smaller, since the number of pixels obtainable after super-resolution processing is small as described above, processing time required for super-resolution processing can be shortened. Thus, also by using the image processing according to the first modified example, processing speed can be enhanced much more than conventional image processing.

Second Modified Example

Figure 19A:
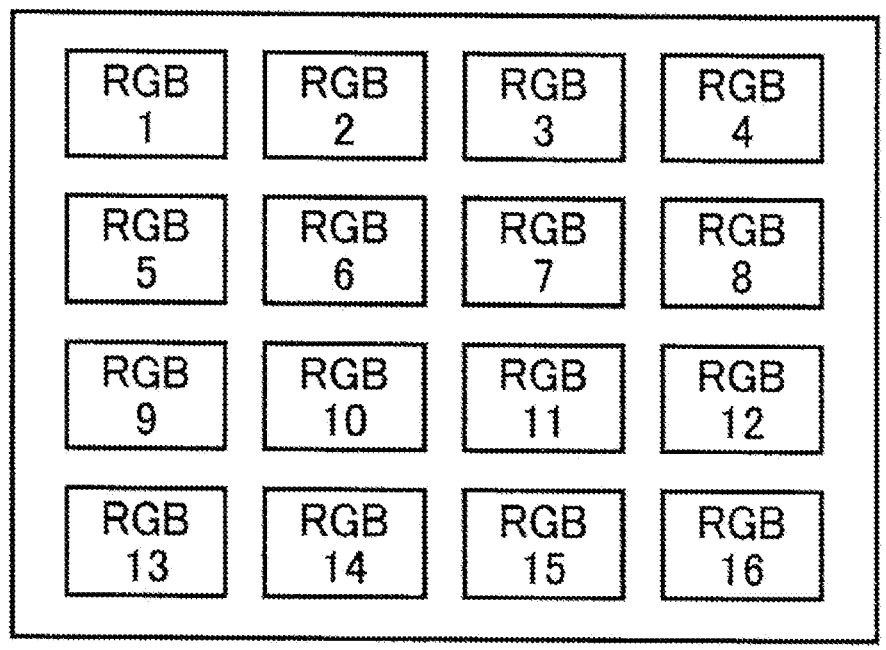
FIG. 19A is a diagram illustrating a specific example of an optical image input on an image sensor according to a second modified example.
Figure 19B:
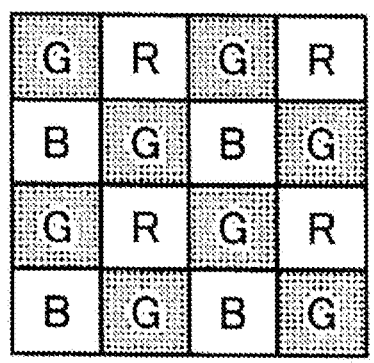
FIG. 19B is a diagram illustrating a specific example B of a color filter according to the second modified example.

A configuration for obtaining an input image group having a plurality of color channels is not limited to the example in which an optical image from one lens 22a passes through a color filter of a single color, as illustrated in FIG. 4B. FIG. 19A is a diagram illustrating a specific example of an optical image input on an image sensor 22b according to the second modified example. More specifically, referring to FIG. 19A, as another example, an optical image from one lens 22a may be input on the image sensor 22b through a color filter different for each pixel. In this case, one input image has a color channel different for each pixel. As illustrated in FIG. 19B as an example, an example in which color filters of three colors, i.e., red (R), green (G), and blue (B) are arranged in a Bayer arrangement on a pixel-basis is given. In a case in which color filters are arranged as illustrated in FIG. 19B, "the total number of pixels for each color channel" is obtained by (the number of pixels in one input image of a target color channel)×(the number of input images). In this case, the selection unit 361 of the super-resolution processing unit 36 illustrated in FIG. 1 selects, from each input image, a pixel to be used in super-resolution processing for each color channel.

Figure 20A:
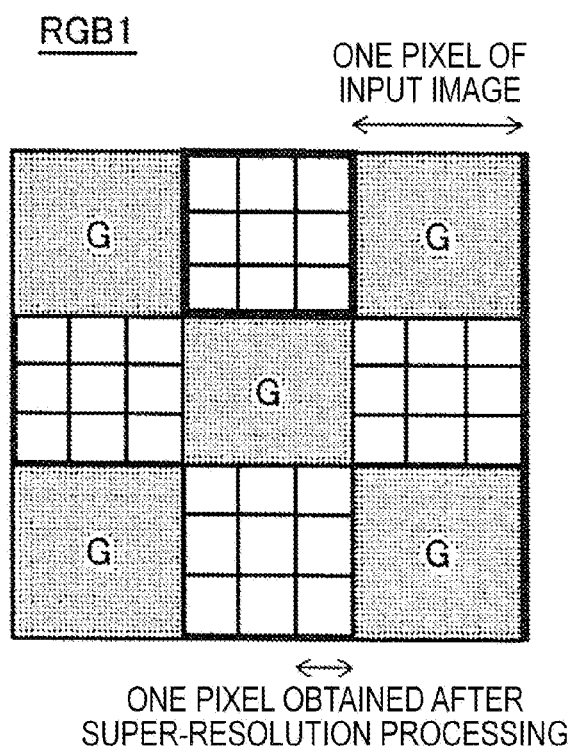
FIG. 20A is a diagram illustrating an overview of super-resolution processing of a green channel according to the second modified example.
Figure 20B:
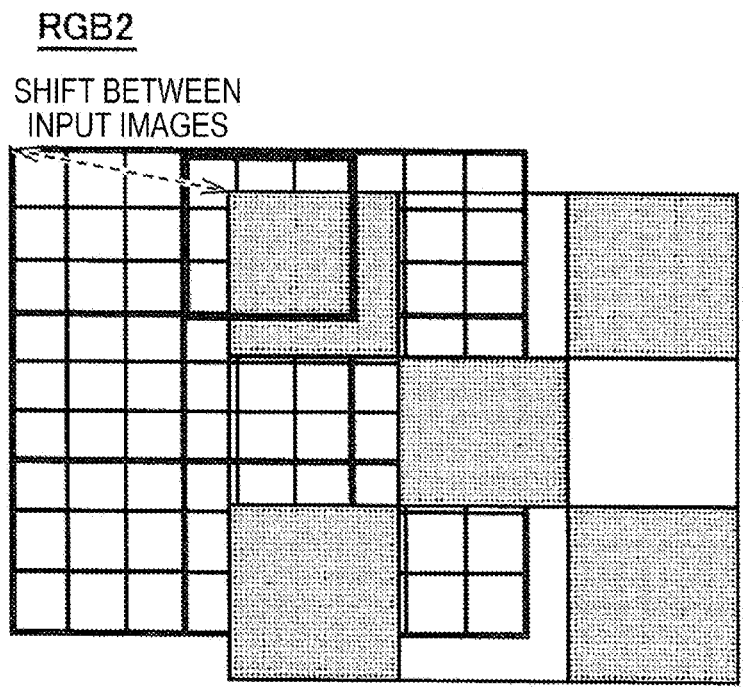
FIG. 20B is a diagram illustrating an overview of super-resolution processing of a green channel according to the second modified example.
Figure 21:
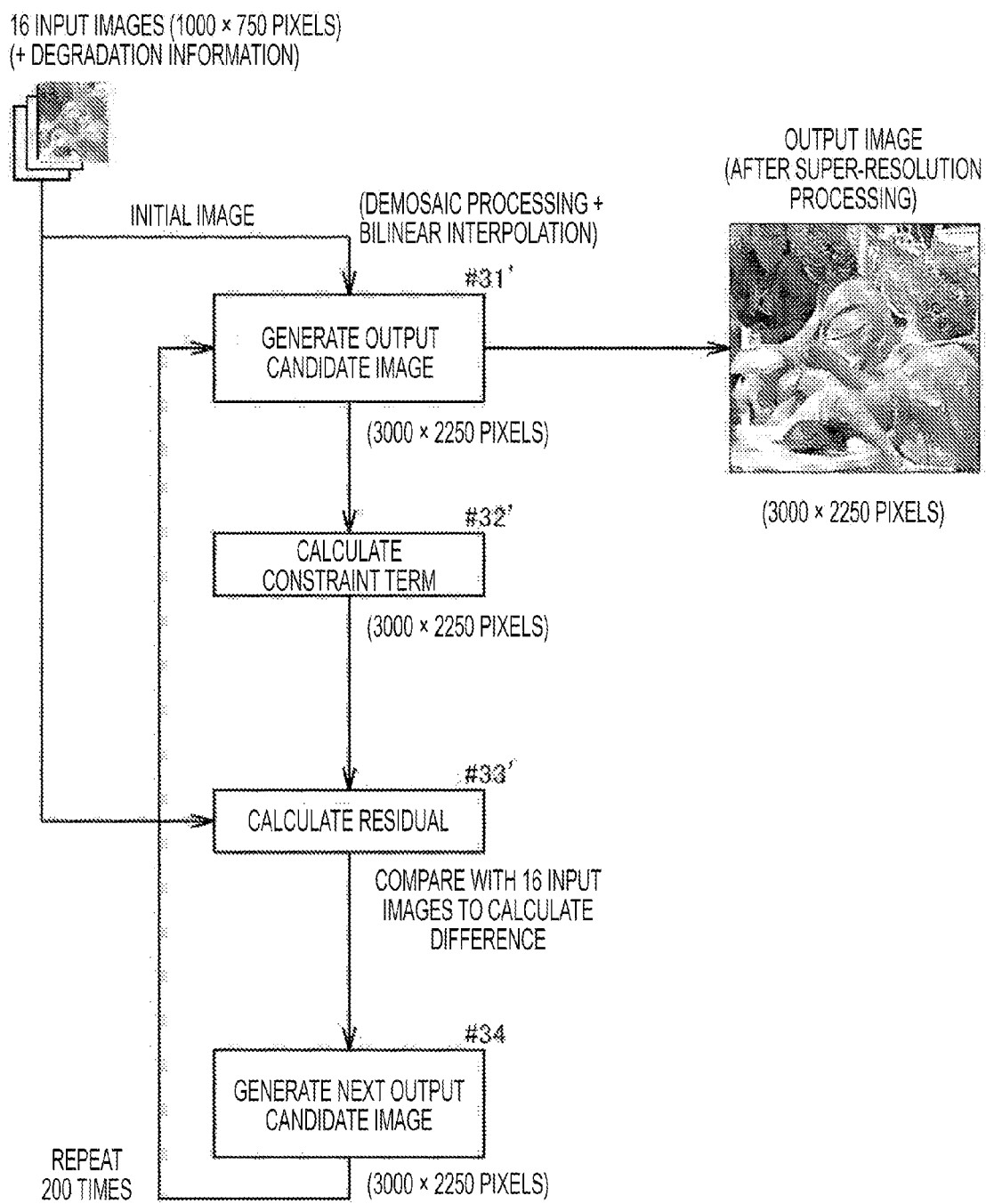
FIG. 21 is a diagram illustrating a flow of super-resolution processing according to the second modified example.

FIGS. 20A and 20B are diagrams illustrating an overview of super-resolution processing of a green channel according to the second modified example. In addition, FIG. 21 is a diagram illustrating a flow of super-resolution processing according to the second modified example, and in particular, illustrates a specific example of a super-resolution image for the input image of the green channel. This flow is basically similar to the flow of the super-resolution processing in FIG. 7, but partially different therefrom since the configuration of an input image is different. Thus, the different point will be described.

More specifically, referring to FIG. 21, in the second modified example, when an initial image is generated, demosaic processing is performed on an input image and a pixel to be used in super-resolution processing is selected, and then, an initial image is generated by bilinear or the like (step #31'). In the demosaic processing, for example, when super-resolution processing of a green channel is performed, pixel values of pixels of the green channel in the input image are directly used. Meanwhile, as pixel values at pixel position of red and blue channels, values bilinear-interpolated from neighboring pixels are used. As an example, processing of replacing pixel values of red and blue channels with the average value of 4 pixels (upper, lower, left, and right pixels) surrounding a corresponding pixel.

Next, in the second modified example, only pixels corresponding to a color channel in each input image are used in calculating residual, as illustrated in FIGS. 20A and 20B. More specifically, referring to FIGS. 20A and 20B, in the case of super-resolution processing of the green channel, only pixels of the green channel in each input image are used, and pixels of red and blue channels are not used in the calculation. In the first input image, only pixels of the green channel that are indicated by hatching in FIG. 20A are used. In the second input image, in FIG. 20B, only pixels of the green channel that correspond to the regions (for example, regions on the left and right of a thick frame) corresponding to the hatched regions in FIG. 20A are used. The same applies to super-resolution processing of other color channels.

In addition, in the case of the second modified example as well, as described in the first modified example, other types of processing may be employed as super-resolution processing so long as the processing is reconstruction-type super-resolution processing for generating one image from a plurality of input images. More specifically, as described in the first modified example, a constraint term other than the amount of BTV, such as, for example, a 4-neighbor Laplacian may be used.

Third Modified Example

In the above example, an information amount being the total number of pixels (the number of input images, the number of pixels) is assumed to be different for each color channel in an input image. As another example, even if an information amount is the same among all the color channels, in some cases, an information amount used in super-resolution processing is different. As a result, even if the total number of pixels of each color channel is the same, super-resolution processing may be performed so that, for example, a green channel has a magnification higher than that in red and blue channels. This example is attributed to the fact that red (R), blue (B), and green (G) contribute to luminance components at about a ratio of 0.3 R+0.6 G+0.1 B (3:6:1). More specifically, since human eyes are sensitive more to luminance components than to chromaticity components, the green channel serves as more important information than red and blue channels from the aspect of image quality. Thus, even if the total number of pixels of each color channel of an input image is at the same ratio, if the number of pixels of each of red and blue channels that are used in super-resolution processing is about a half of the number of pixels of the green channel, image quality obtained after super-resolution processing cannot be largely impaired.

In addition, as another example, in a case in which a four-color input image using C, M, Y, and G filters which are complementary filters of R, G, and B is obtained, since yellow (Y), which is an opposite color to blue, does not contribute to luminance so much as other colors do, the number of yellow pixels used in super-resolution processing may be about a half of the total number of pixels of each of other colors (C, M, and G).

Figure 22:
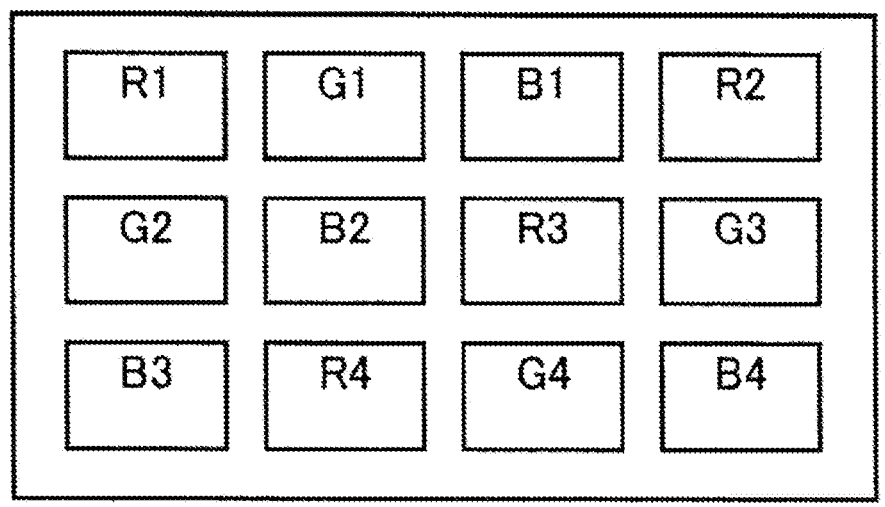
FIG. 22 is a diagram illustrating a specific example of an optical image input on an image sensor according to a third modified example.

FIG. 22 is a diagram illustrating a specific example of an optical image input on an image sensor 22b according to a third modified example. As an example, as illustrated in FIG. 22, in an array camera having 12 lenses 22a, the same number of images are input for each color channel. In this case as well, "the total number of pixels for each color channel" is obtained by (the number of pixels of a target color channel for one input image)×(the number of input images).

Figure 23:
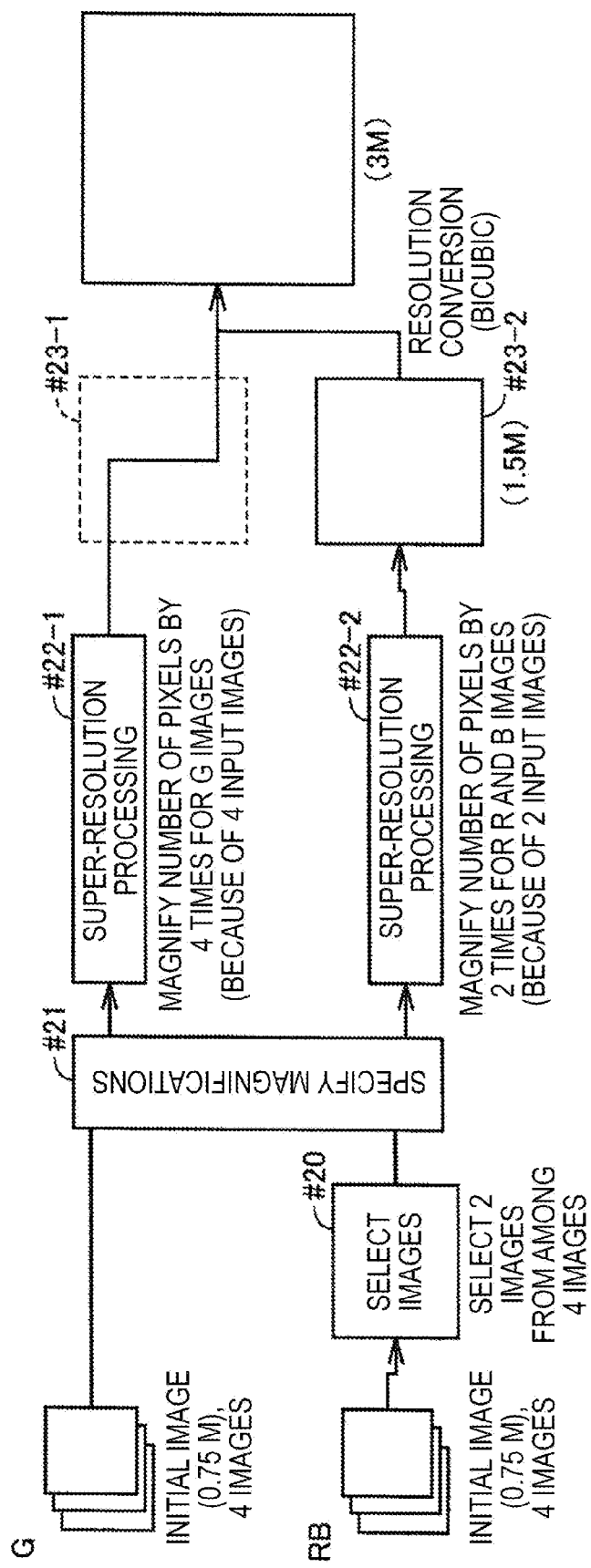
FIG. 23 is a diagram illustrating a flow of image processing according to the third modified example.

FIG. 23 is a diagram illustrating a flow of image processing in an image processing apparatus 1 according to the third modified example. Referring to FIG. 23, in the third modified example, the same number of images (4 images) are input for each color channel as illustrated in FIG. 22, but for red and blue channels, processing of selecting, from among the input images, input images to be used in super-resolution processing is performed (step #20). Then, a combination of a magnification of super-resolution processing and a magnification of resolution conversion processing is specified for each color channel of an input image to be processed (step #21), and respective types of processing are performed (steps #22 and #23).

In addition, in the above-described step #20, input images with good image quality are preferably determined, and input images to be used are selected according to the determination result. When an image is captured, part of the image may contain ring-shaped or circular-shaped blurring called flare or ghost. Thus, by removing images having such a defect, image quality of an image obtained after super-resolution processing can be improved.

Figure 24:
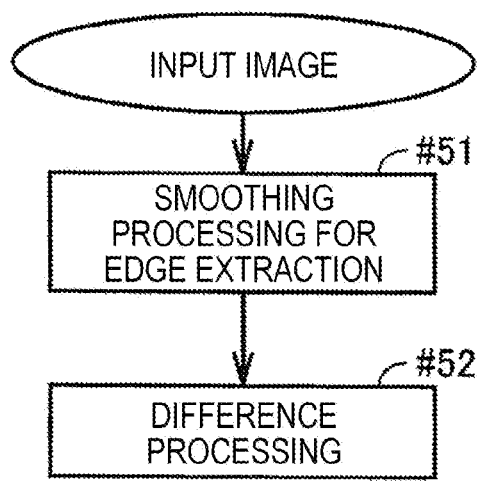
FIG. 24 is a diagram illustrating an example of a flow of selection processing in step #20 in FIG. 23.
Figure 25:
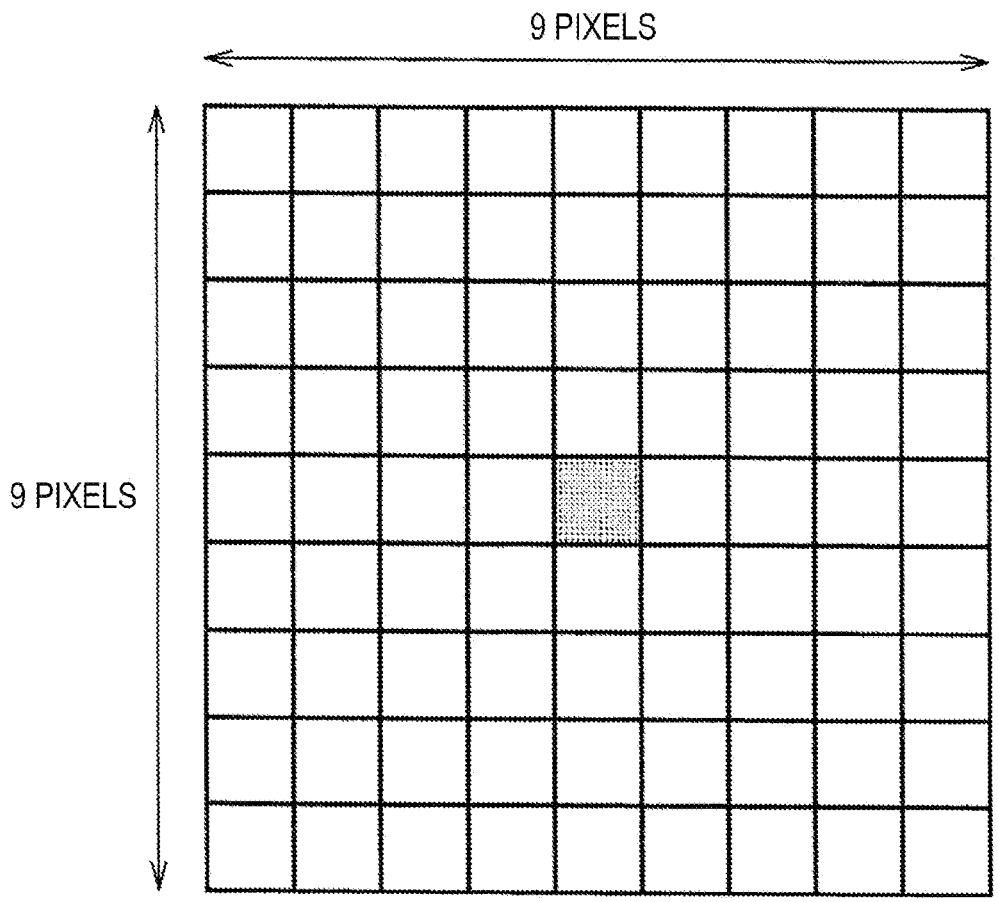
FIG. 25 is a diagram illustrating a specific example of an averaging filter used in an example of selection processing in step #20 in FIG. 23.

FIGS. 24 and 25 are diagrams illustrating an example of a flow of selection processing in the above-described step #20. More specifically, referring to FIG. 24, since high frequency components decrease due to blurring if flare or ghost occurs, the following processing can be desirably performed. For example, smoothing processing is performed for each input image using an averaging filter as illustrated in FIG. 25 (step #51). Then, a difference in an image between before and after the processing is calculated (step #52) to thereby extract high frequency components, and an input image with a high value thereof is used in super-resolution processing. As a result, an image containing neither flare nor ghost can be used in super-resolution processing. In addition, another method may be used for this image quality determination. For example, an image may be converted into a frequency.

In this manner, even if the total number of pixels differ for each color channel, the image processing apparatus 1 can specify a combination of magnifications according to respective types of processing, and perform image processing. Thus, in a case in which the total number of pixels for each color channel is the same, an image to be used in super-resolution processing is selected, thereby enhancing processing speed without deteriorating image quality obtainable after super-resolution processing.

The embodiments disclosed this time are exemplifications in all respects, and are not to be construed in a limiting sense. The scope of the present invention is not indicated by the above descriptions, but by the claims. In addition, meanings equivalent to the claims and all modification within the scope are intended to be included.

The invention claimed is:

1. An image processing apparatus for generating, from an input image group having a plurality of color channels and input images each having a common partial region, a high resolution image having higher frequency information than the input images, and outputting the generated high resolution image, the image processing apparatus comprising:
a super-resolution processor configured to execute super-resolution processing on the input images;
a resolution convertor configured to execute resolution conversion processing on the input images having been subjected to the super-resolution processing;
wherein the image processing apparatus is configured to:
specify a combination of a magnification of the super-resolution processing and a magnification of the resolution conversion processing for each of the color channels; and
specify the combination so that a magnification of the super-resolution processing of at least one of the color channels differs from a magnification of the super-resolution processing of other color channels of the color channels.

2. The image processing apparatus according to claim 1, wherein the image forming apparatus is configured to specify a magnification of the super-resolution processing according to the number of pixels for each of the color channels that are to be used in the super-resolution processing among the input image group, and specify a magnification of the resolution conversion processing based on a magnification of the super-resolution processing specified for each of the color channels.

3. The image processing apparatus according to claim 2, wherein the image forming apparatus is configured to set 1 as a magnification of the resolution conversion processing for a first color channel having a highest magnification of the super-resolution processing, and specify a magnification of the resolution conversion processing of color channels other than the first color channel so that, for each of color channels other than the first color channel, the number of pixels of the color channel that is obtainable after the resolution conversion processing becomes the same as the number of pixels of the first color channel that is obtainable after the super-resolution processing.

4. The image processing apparatus according to claim 1, wherein the input image group has a color channel of a single color for each of the input images.

5. The image processing apparatus according to claim 4, further comprising a selection unit for selecting, from among the input images, an input image to be used in the super-resolution processing, for each color channel of the input images.

6. The image processing apparatus according to claim 1, wherein
in the input image group, each of the input images has a different color channel for each pixel, and
the first processing unit uses, among the input images, a pixel corresponding to a color channel to be subjected to the super-resolution processing.

7. The image processing apparatus according to claim 1, wherein the input image group is an image group obtained by a lens array including a plurality of lenses having optical axes different from each other.

8. The image processing apparatus according to claim 1, wherein the input image group is captured by an imaging apparatus at different timings with viewpoints being varied from each other.

9. An image processing method for generating, from an input image group having a plurality of color channels and input images each having a common partial region, a high resolution image having higher frequency information than the input images, as an output image, the method comprising:
specifying a combination of a magnification of super-resolution processing and a magnification of resolution conversion processing for each of the color channels at a specification unit;
executing, on the input images, the super-resolution processing at the specified magnification at a super-resolution processor; and
executing, on the input images having been subjected to the super-resolution processing, the resolution conversion processing at the specified magnification at a resolution convertor, wherein
the combination is specified so that a magnification of the super-resolution processing of at least one of the color channels differs from a magnification of the super-resolution processing of other color channels of the color channels.

10. A non-transitory recording medium storing a computer readable image processing program for causing a computer to execute processing for generating, from an input image group having a plurality of color channels and input images each having a common partial region, a high resolution image having higher frequency information than the input images, as an output image, and causing the computer to execute:
a process of specifying a combination of a magnification of super-resolution processing and a magnification of resolution conversion processing for each of the color channels;

a process of executing, on the input images, the super-resolution processing at the specified magnification; and a process of executing, on the input images having been subjected to the super-resolution processing, the resolution conversion processing at the specified magnification, wherein in the process of specifying the combination, the combination is specified so that a magnification of the super-resolution processing of at least one of the color channels differs from a magnification of the super-resolution processing of other color channels of the color channels.

* * * * *